United States Patent
Sood et al.

(10) Patent No.: US 9,742,790 B2
(45) Date of Patent: Aug. 22, 2017

(54) TECHNOLOGIES FOR SECURE PERSONALIZATION OF A SECURITY MONITORING VIRTUAL NETWORK FUNCTION

(71) Applicant: Intel Corporation, Santa Clara, CA (US)

(72) Inventors: Kapil Sood, Beaverton, OR (US); Manuel Nedbal, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 136 days.

(21) Appl. No.: 14/866,565

(22) Filed: Sep. 25, 2015

(65) Prior Publication Data
US 2016/0373474 A1    Dec. 22, 2016

Related U.S. Application Data

(60) Provisional application No. 62/180,433, filed on Jun. 16, 2015.

(51) Int. Cl.
  *H04L 29/06*     (2006.01)
  *H04L 12/24*     (2006.01)
  (Continued)

(52) U.S. Cl.
  CPC ......... *H04L 63/1425* (2013.01); *G06F 21/50* (2013.01); *G06F 21/53* (2013.01);
  (Continued)

(58) Field of Classification Search
  CPC ... H04L 63/062; H04L 63/20; H04L 63/0227; H04L 63/0254; H04L 63/1425;
  (Continued)

(56) References Cited

U.S. PATENT DOCUMENTS

2008/0005791 A1* 1/2008 Gupta ................... G06F 21/562
 726/15
2010/0005504 A1* 1/2010 Gottimukkala ......... H04L 63/20
 726/1

(Continued)

FOREIGN PATENT DOCUMENTS

CN  WO2016026129  * 2/2016 ............. G06F 21/00

*Primary Examiner* — Hadi Armouche
*Assistant Examiner* — Hee Song
(74) *Attorney, Agent, or Firm* — Barnes & Thornburg LLP

(57) ABSTRACT

Technologies for secure personalization of a security monitoring virtual network function (VNF) in a network functions virtualization (NFV) architecture include various security monitoring components, including a NFV security services controller, a VNF manager, and a security monitoring VNF. The security monitoring VNF is configured to receive provisioning data from the NFV security services controller and perform a mutually authenticated key exchange procedure using at least a portion of the provisioning data to establish a secure communication path between the security monitoring VNF and a VNF manager. The security monitoring VNF is further configured to receive personalization data from the VNF manager via the secure communication path and perform a personalization operation to configure one or more functions of the security monitoring VNF based on the personalization data. Other embodiments are described and claimed.

23 Claims, 12 Drawing Sheets

(51) Int. Cl.
*G06F 21/50* (2013.01)
*G06F 21/53* (2013.01)

(52) U.S. Cl.
CPC ............ *H04L 41/28* (2013.01); *H04L 63/062* (2013.01); *H04L 63/20* (2013.01)

(58) Field of Classification Search
CPC ..... H04L 63/1408; H04L 41/28; H04L 43/08; H04L 29/06578; H04L 29/06986
See application file for complete search history.

(56) References Cited

U.S. PATENT DOCUMENTS

| | | | | |
|---|---|---|---|---|
| 2015/0180730 | A1* | 6/2015 | Felstaine | H04L 41/022 709/225 |
| 2015/0288622 | A1* | 10/2015 | Fargano | H04L 41/0813 370/401 |
| 2015/0381423 | A1* | 12/2015 | Xiang | H04L 41/0893 709/223 |
| 2016/0142427 | A1* | 5/2016 | de los Reyes | H04L 63/20 726/23 |
| 2016/0277509 | A1* | 9/2016 | Qiang | H04L 67/16 |
| 2016/0335111 | A1* | 11/2016 | Bruun | G06F 9/45558 |

* cited by examiner

TECHNOLOGIES FOR SECURE PERSONALIZATION OF A SECURITY MONITORING VIRTUAL NETWORK FUNCTION

CROSS-REFERENCE TO RELATED APPLICATION

The present application claims priority under 35 U.S.C. §119(e) to U.S. Provisional Patent Application Ser. No. 62/180,433, entitled "TECHNOLOGIES FOR SECURE PERSONALIZATION OF A SECURITY MONITORING VIRTUAL NETWORK FUNCTION," which was filed on Jun. 16, 2015.

BACKGROUND

Network operators and service providers typically rely on various network virtualization technologies to manage complex, large-scale computing environments, such as high-performance computing (HPC) and cloud computing environments. For example, network operators and service provider networks may rely on network function virtualization (NFV) deployments to deploy network services (e.g., firewall services, network address translation (NAT) services, load-balancing services, deep packet inspection (DPI) services, transmission control protocol (TCP) optimization services, etc.). Such NFV deployments typically use an NFV infrastructure to orchestrate various virtual machines (VMs) to perform virtualized network services, commonly referred to as virtualized network functions (VNFs), on network traffic and to manage the network traffic across the various VMs.

Unlike traditional, non-virtualized deployments, virtualized deployments decouple network functions from underlying hardware, which results in network functions and services that are highly dynamic and generally capable of being executed on off-the-shelf servers with general purpose processors. As such, the VNFs can be scaled-in/out as necessary based on particular functions or network services to be performed on the network traffic. However, traditional means of accessing exposed interfaces (e.g., access interfaces via probes) for monitoring the processing of the network traffic between the functional components of the traditional, non-virtualized deployments are not as distinct for access in VNF deployments. For example, the Industry Specification Group for NFV of the European Telecommunications Standards Institute (ETSI) has published a number of virtualized models wherein such access/monitoring interfaces may be obscured. Further, the number of different access interfaces available in the various deployments (e.g., within a VNF, between VNFs, etc.) may make it difficult to probe for desired information about the VNFs. For example, some deployments may implement vendor-proprietary, non-standardized interfaces in order to optimize processing power and reduce latency attributable to signaling, which may limit access availability.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
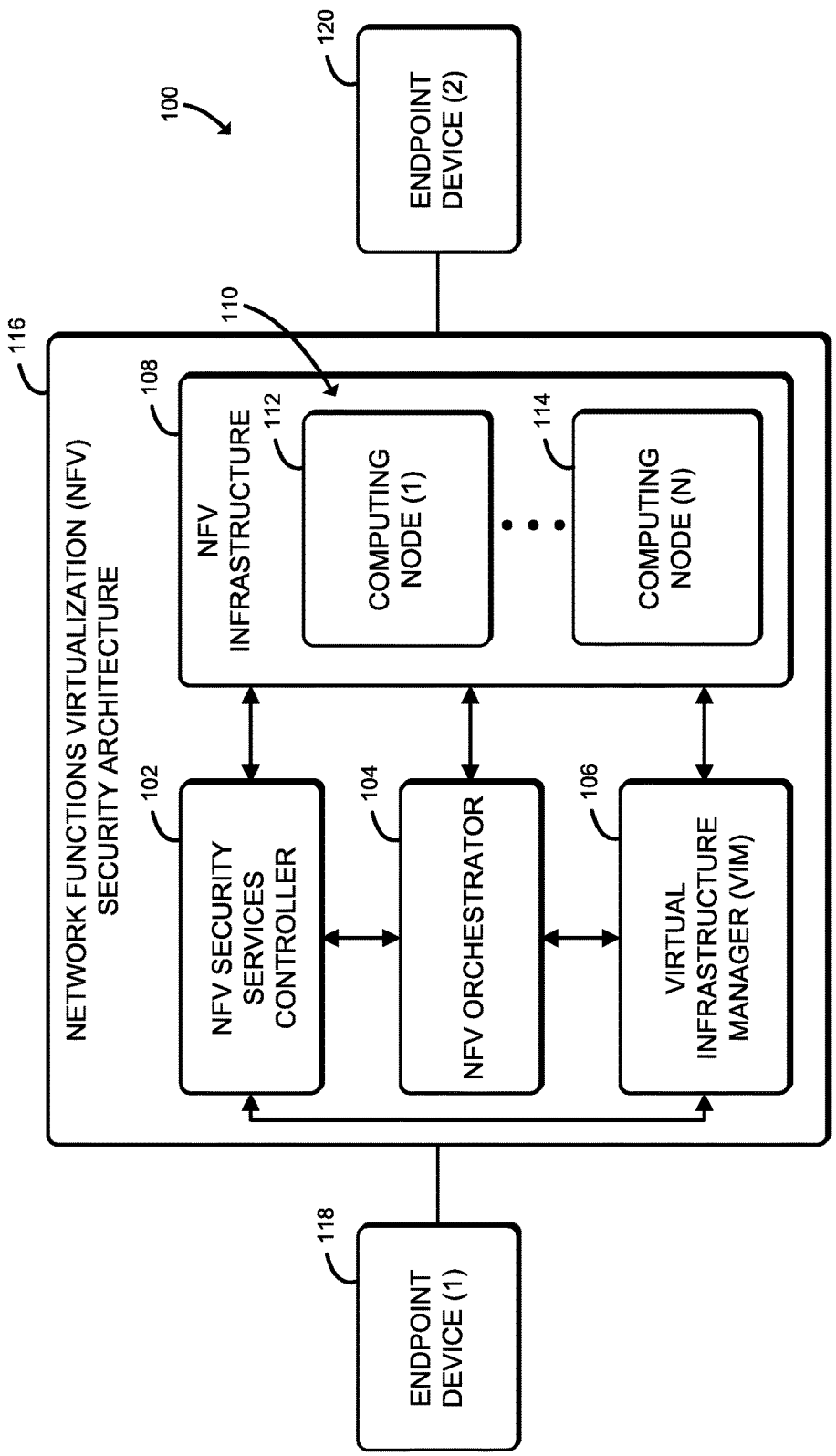
FIG. 1 is a simplified block diagram of at least one embodiment of a system for monitoring the security of network communications processed at a network functions virtualization (NFV) security architecture that includes one or more computing nodes of an NFV infrastructure.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for monitoring the security of network communications includes a network functions virtualization (NFV) security architecture 116 to process network communications between an endpoint device 118 and another endpoint device 120. The NFV security architecture 116 includes a number of network processing components, including an NFV orchestrator 104, a virtual infrastructure manager (VIM) 106, and an NFV infrastructure 108. It should be appreciated that, in some embodiments, the NFV security architecture 116 may include additional and/or alternative network processing components (physical and/or virtual) to perform processing functions (e.g., analysis, network functions, etc.) on the network traffic data (e.g., network traffic payloads, network packet headers, etc.).

Additionally, the NFV security architecture 116 includes a number of security monitoring components, including an NFV security services controller 102. In use, the NFV security services controller 102 manages the various security monitoring components across the NFV security architecture 116, which perform active and/or passive monitoring of telemetry data. To do so, the NFV security services controller 102 instantiates a number of NFV security services agents (see, e.g., the NVF security services agent 468 of FIG. 4) to monitor based on a security policy managed by the NFV security services controller 102 (see, e.g., the hypervisor 462 of FIG. 4). The NFV security services agents are additionally configured to collect, package, and securely transmit the telemetry data for analysis.

The telemetry data collected by each of the NFV security services agents may be embodied as, or otherwise include, any type of data on which a security analysis may be performed. For example, the illustrative telemetry data includes component-level configuration, operation, and policy data respective of the component on which the NFV security services agent resides and network traffic data processed relative to that component. As discussed in more detail below, the NFV security services agents are configured to package the information and securely transfer the packaged information to an NFV security monitoring analytics system (see, e.g., NFV security monitoring analytics system 438 of FIG. 4). In use, the NFV security monitoring analytics system determines whether any threats and/or anomalies are present in the telemetry data. The NFV security monitoring analytics system additionally provides the NFV security services controller 102 with a remediation security policy to address any detected threats and/or anomalies. In response, the NFV security services controller 102 updates the security policy for the NFV security services agents based on the remediation security policy and enforces the updated security policy across the NFV security services agents.

As will be described in further detail below, the NFV infrastructure 108 includes one or more computing nodes 110 capable of managing (e.g., creating, moving, destroying, etc.) a number of virtual machines (VMs) that are configured to operate as virtualized network function (VNF) instances. Each of the VNF instances, or VNFs, typically relies on one or more VMs, which may be running different software and/or processes to perform network services on network traffic (e.g., firewall services, network address translation (NAT) services, load-balancing services, deep packet inspection (DPI) services, transmission control protocol (TCP) optimization services, intrusion detection services, etc.). Further, to provide certain network services, multiple VNFs may be created as a service function chain, or a VNF forwarding graph (i.e., a series of VNFs performed in an ordered sequence to implement the desired network service).

The network and security monitoring components of the NFV security architecture 116 can be deployed in various virtualization network architectures, such as a virtual Evolved Packet Core (vEPC) infrastructure, a virtualized Customer Premise Equipment (vCPE) infrastructure, or any other type of operator visualized infrastructures. It should be appreciated that, depending on the network architecture in which the NFV security architecture 116 is deployed, the NFV security architecture 116 may include one or more NFV security services controllers 102, one or more NFV orchestrators 104, one or more VIMs 106, and/or one or more NFV infrastructures 108.

The NFV security services controller 102 may be embodied as, or otherwise include, any type of hardware, software, and/or firmware capable of performing the functions described herein, such as managing the security monitoring components of the NFV security architecture 116. As will be described in further detail below, the NFV security services controller 102 is configured to function as a security monitoring orchestrator. To do so, the NFV security services controller 102 is configured to transmit a security monitoring policy that includes various monitoring rules, which may include security monitoring policies, secure communication path policies, configuration parameters, and function descriptors to indicate to the security monitoring components throughout the NFV security architecture 116 (e.g., the NFV security services agents of FIG. 4) which telemetry data to monitor and how to configure the security monitoring components. The NFV security services controller 102 is additionally configured to enforce the security monitoring policies transmitted throughout the NFV security architecture 116. The various security functions may include, but are not limited to, securing service function chaining (SFC) provisioning, enforcing SFC security configuration and monitoring, providing confidentiality protected tokens, managing protected policy transmission, and providing inter-VNF SFC path protection.

To retrieve and/or update the security monitoring policies, the NFV security services controller 102 may be configured to interface with one or more external security systems (e.g., an Intel® Security Controller), security databases (see the NFV security database 412 of FIG. 4), and/or security policy engines. To communicate with the external security systems, the NFV security services controller 102 may deliver an application programming interface (API) and/or the security policy to the external security services orchestration systems. In some embodiments, the NFV security services controller 102 may act as a trusted third party to authenticate messages across the various network and security monitoring components of the NFV security architecture 116.

Further, the NFV security services controller 102 is configured to manage one or more security monitoring VNFs, or virtual security function (VSF) VNFs, to deploy into virtualized environments to create a set of virtual security devices. Accordingly, the NFV security services controller 102 may be configured to maintain a consistent state across the NFV security architecture 116 according to the aforementioned security policy. A security monitoring VNF (see, e.g., the security monitoring VNF 446 of FIG. 4 described in further detail below) is a purpose-built security virtual appliance which is capable of interacting with the NFV security services controller 102.

For example, security monitoring VNFs may be firewalls, intrusion detection/prevent systems, anti-malware, sandboxes, security identity managers, data loss prevention, or any other security functions to deploy the components of the NFV security architecture 116. Accordingly, the NFV security services controller 102 may be configured to expose a catalog of security functions that can be orchestrated by the NFV security services controller 102, register the security monitoring VNFs into the VIM 106, manage instances of the security monitoring VNFs, pair the security monitoring VNFs with their respective VNF managers (e.g., the VNF manager 432 of FIG. 4), personalize the security monitoring VNFs, manage the security policy, as well as perform integrity assertion, credential management, facilitate clustering of multiple security monitoring VNFs into a distributed appliance, and monitor the security monitoring VNFs for failure and remediation. It should be appreciated that, since the security monitoring VNFs are VNFs, each security monitoring VNF is associated with a particular VNF manager, which the security monitoring VNFs may connect to for receiving policy and other data (e.g., signatures for malware, etc.) upon secure instantiation (e.g., secure bootstrapping of the security monitoring VNF).

In some embodiments, the security monitoring VNFs may be treated as a uniform cluster. As such, regardless of which security monitoring VNF instance sees workload traffic of a certain type, a uniform result may be defined on the VNF manager. Consequently, an updated policy may be propagated to the individual security monitoring VNFs. In such embodiments, the NFV security services controller 102 may assert the integrity of a security monitoring VNFs and manage other commonalities between security monitoring VNF instances, including credentials, device settings, and/or other operational aspects. In some embodiments, such integrity assertion and management may be performed in an automated fashion. Accordingly, the NFV security services controller 102 may manage multiple security monitoring VNF instances deployed across multiple physical hosts within a NFVI (e.g., the NFVI 440 of FIG. 4), or across distributed NFVIs.

It should be appreciated that, in such embodiments wherein dynamic provisioning is employed, the security monitoring VNF instances may be deployed in a scale in/out manner by the VIM 106. Alternatively, in such embodiments wherein pre-provisioning security monitoring is employed, the security monitoring VNF instances may be deployed into the NFV infrastructure 108 statically. Additionally, a deployment policy may be used to determine what type of security monitoring VNF instances, how many security monitoring VNF instances, etc., to be dynamically deployed or pre-deployed into the NFV infrastructure 108. Accordingly, the NFV security services controller 102 is configured to ensure the security monitoring VNF instances are deployed as per the deployment policy.

The NFV security services controller 102 may be further configured to monitor the health of the security monitoring VNFs and take a corrective action (e.g., create a new security monitoring VNF, terminate an existing VNF, update the security policy, etc.) upon determining the health of a security monitoring VNF may compromise the security integrity of one or more components of the NFV security architecture 116. Accordingly, the NFV security services controller 102 may be configured to receive failure detection and corrective options from the security monitoring VNFs. As such, the NFV security services controller 102 may configure the action to be taken to be automated.

It should be appreciated that, in some embodiments, the NFV security services controller 102 may be co-located with the NFV orchestrator 104, such as in an NFV management and orchestration (MANO) architectural framework. It should be further appreciated that, in some embodiments, the NFV security services controller 102 may have a higher security privilege than the other network and security monitoring components of the NFV security architecture 116 to ensure the integrity and security of the NFV security services controller 102.

The NFV orchestrator 104 may be embodied as any type of circuitry and/or hardware, software, and/or firmware components capable of performing the functions described herein, such as managing the lifecycle of the VNFs (e.g., instantiation, scale-out/in, performance measurements, event correlation, termination, etc.) via a VNF manager (see FIG. 4), managing global resources, validating and authorizing resource requests of the NFV infrastructure 108, on-boarding of new VNFs, and/or managing various policies and packages for the VNFs. For example, the NFV orchestrator 104 may be configured to receive resource requests from an operator that impacts a particular VNF. In use, the NFV orchestrator 104 manages any applicable processing, storage, and/or network configuration adjustments, based on the operator requests, to bring the VNF into operation or into compliance with the resource requests. Once in operation, the NFV orchestrator 104 may monitor the VNF for capacity and utilization, which may be adjusted by the NFV orchestrator 104, as necessary.

The VIM 106 may be embodied as, or otherwise include, any type of hardware, software, and/or firmware capable of performing the functions described herein, such as controlling and managing the NFV infrastructure 108 compute, storage, and network resources (e.g., physical and virtual) within one operator's infrastructure sub-domain, as well as collection and forwarding of performance measurements and events. It should be appreciated that, in some embodiments, the NFV orchestrator 104 may be co-located with the VIM 106, such as in the NFV MANO architectural framework.

The NFV infrastructure 108 may be embodied as, or otherwise include, any type of virtual and/or physical processing and storage resources, such as one or more servers or other computing nodes, as well as virtualization software. For example, the illustrative NFV infrastructure 108 includes one or more computing nodes 110. The illustrative computing nodes 110 include a first computing node, which is designated as computing node (1) 112, and a second computing node, which is designated as computing node (N) 114 (i.e., the "Nth" computing node of the computing nodes 110, wherein "N" is a positive integer and designates one or more additional computing nodes 110).

Figure 2:
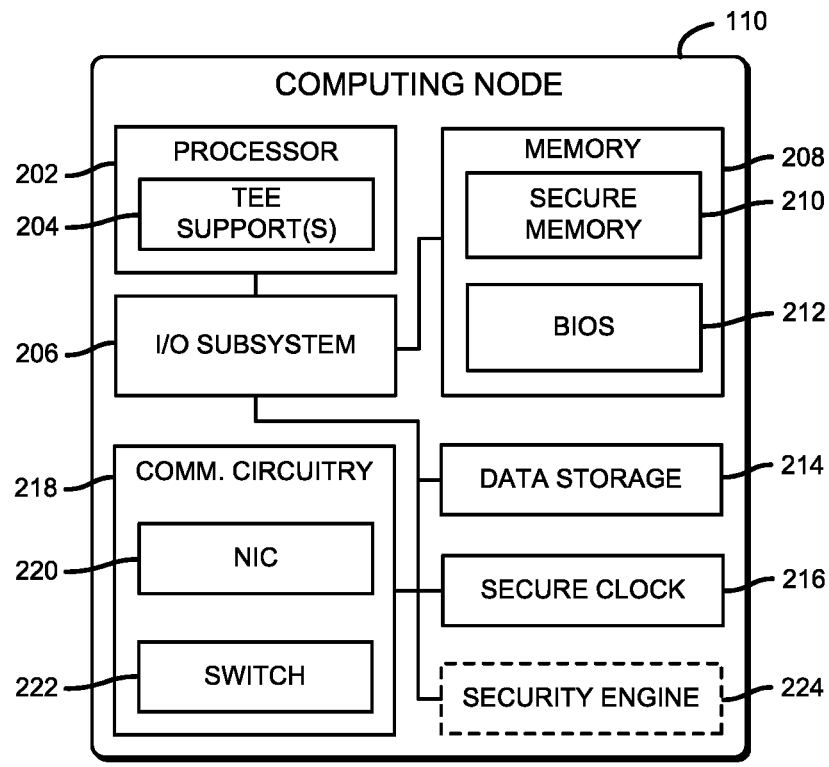
FIG. 2 is a simplified block diagram of at least one embodiment of one of the computing nodes of the NFV infrastructure of the system of FIG. 1.

The computing nodes 110 may be embodied as any type of computation or computer device capable of performing the functions described herein, including, without limitation, a server (e.g., stand-alone, rack-mounted, blade, etc.), a network appliance (e.g., physical or virtual), a high-performance computing device, a web appliance, a distributed computing system, a computer, a processor-based system, a multiprocessor system, a smartphone, a tablet computer, a laptop computer, a notebook computer, and/or a mobile computing device. As shown in FIG. 2, in an embodiment, each of the computing nodes 110 illustratively includes a processor 202, an input/output (I/O) subsystem 206, a memory 208, a data storage device 214, a secure clock 216, and communication circuitry 218. Of course, the computing node 110 may include other or additional components, such as those commonly found in a server (e.g., various input/output devices), in other embodiments. Additionally, in some embodiments, one or more of the illustrative components may be incorporated in, or otherwise form a portion of, another component. For example, the memory 208, or portions thereof, may be incorporated in the processor 202 in some embodiments.

The processor 202 may be embodied as any type of processor capable of performing the functions described herein. For example, the processor 202 may be embodied as a single or multi-core processor(s), digital signal processor, microcontroller, or other processor or processing/controlling circuit. The illustrative processor 202 includes one or more trusted execution environment (TEE) supports 204, or secure enclave supports, which may be utilized by the computing node 110 in establishing a trusted execution environment. It should be appreciated that, in some embodiments, the TEE supports 204 provide hardware-reinforced security for the trusted execution environment in which executing code may be measured, verified, or otherwise determined to be authentic. For example, the TEE supports 204 may be embodied as Intel® Software Guard Extensions (SGX) technology. Although the TEE supports 204 are illustratively shown in the processor 202, it should be appreciated that, in some embodiments, one or more of the other components of the computing node 110 may include the TEE supports 204. Further, in some embodiments, processor 202 of the computing node 110 may include a security engine (e.g., security engine 224 discussed below), a manageability engine, or a security co-processor configured to utilize the TEE supports 204 to establish a trusted execution environment.

The memory 208 may be embodied as any type of volatile or non-volatile memory or data storage capable of performing the functions described herein. In operation, the memory 208 may store various data and software used during operation of the computing node 110 such as operating systems, applications, programs, libraries, and drivers. The memory 208 is communicatively coupled to the processor 202 via the I/O subsystem 206, which may be embodied as circuitry and/or components to facilitate input/output operations with the processor 202, the memory 208, and other components of the computing node 110. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The illustrative memory 208 includes a secure memory 210. In some embodiments, the secure memory 210 may be embodied as a secure partition of the memory 208; whereas, in other embodiments, the secure memory 210 may be embodied or included on a separate hardware component of the computing node 110. As described herein, the secure memory 210 may store various data provisioned to the computing node 110. For example, the secure memory 210 may store a secure key (e.g., an attestation key, a private direct anonymous attestation (DAA) key, an Enhanced Privacy Identification (EPID) key, or any other type of secure/cryptographic key) of the computing node 110 that may be provisioned by a manufacturer of the chipset and/or of a trusted execution environment. The secure memory 210 may also store a password, PIN, or other unique identifier of the computing node 110 provisioned therein, for example, by an original equipment manufacturer (OEM) of the computing node 110. Of course, it should be appreciated that the secure memory 210 may store various other data depending on the particular embodiment (e.g., group names, device identifiers, whitelists, expected PIN values, etc.). In some embodiments, the provisioned data may be stored in read-only memory of the secure memory 210.

The illustrative memory 208 additionally includes a basic input/output system (BIOS) 212. The BIOS 212 includes instructions (e.g., a BIOS driver used during booting of the computing node 110) to initialize the computing node 110 during the boot process. In some embodiments, the computing node 110 may facilitate the orchestration of the VNFs through a main platform firmware, or pre-boot firmware, such as an extension of the Intel® platform chipset or the platform BIOS 212 based on the Unified Extensible Firmware Interface ("UEFI") specification, which has several versions published by the Unified EFI Forum.

The data storage device 214 may be embodied as any type of device or devices configured for short-term or long-term storage of data such as, for example, memory devices and circuits, memory cards, hard disk drives, solid-state drives, or other data storage devices. In use, as described below, the data storage device 214 and/or the memory 208 may store security monitoring policies, configuration policies, or other, similar data.

The secure clock 216 may be embodied as any hardware component(s) or circuitry capable of providing a secure timing signal and otherwise performing the functions described herein. For example, in the illustrative embodiment, the secure clock 216 may generate a timing signal that is separate and functionally independent from other clock sources of the computing node 110. Accordingly, in such embodiments, the secure clock 216 may be immune or resistant to alteration by other entities such as, for example, software executing on the computing node 110. It should be appreciated that, in some embodiments, the secure clock 216 may be embodied as standalone component(s) or circuitry, whereas in other embodiments the secure clock 216 may be integrated with or form a secure portion of another component (e.g., the processor 202). For example, in some embodiments, the secure clock 216 may be implemented via an on-chip oscillator and/or embodied as a secure clock of a manageability engine (ME). It should further be appreciated that the secure clock 216 may be synchronized to the secure clocks of the other computing nodes 110 and granularity may be of the order that can distinguish distinct message timings.

The communication circuitry 218 of the computing node 110 may be embodied as any communication circuit, device, or collection thereof, capable of enabling communications between the computing node 110 and another computing node 110, the NFV orchestrator 104, the VIM 106, the endpoint devices 118, 120, and/or other connected network enabled computing node. The communication circuitry 218 may be configured to use any one or more communication technology (e.g., wired or wireless communications) and associated protocols (e.g., Ethernet, Bluetooth®, Wi-Fi®, WiMAX, GSM, LTE, etc.) to effect such communication. The illustrative communication circuitry 218 includes a network interface card (NIC) 220 and a switch 222. The NIC 220 may be embodied as one or more add-in-boards, daughtercards, network interface cards, controller chips, chipsets, or other devices that may be used by the computing node 110. For example, the NIC 220 may be embodied as an expansion card coupled to the I/O subsystem 206 over an expansion bus, such as PCI Express. The switch 222 may be embodied as any hardware component(s) or circuitry capable of performing network switch operations and otherwise performing the functions described herein, such as an Ethernet switch chip, a PCI Express switching chip, etc.

As discussed above, the computing node 110 may also include a security engine 224, which may be embodied as any hardware component(s) or circuitry capable of establishing a trusted execution environment (TEE) on the computing node 110. In particular, the security engine 224 may support executing code and/or accessing data that is independent and secure from other code executed by the computing node 110. The security engine 224 may be embodied as a Trusted Platform Module (TPM) (e.g., physical or virtual), a manageability engine, an out-of-band (OOB) processor, or other security engine device or collection of devices. In some embodiments the security engine 224 may be embodied as a converged security and manageability engine (CSME) incorporated in a system-on-a-chip (SoC) of the computing node 110.

Referring again to FIG. 1, the illustrative NFV security architecture 116 is communicatively coupled between the two endpoint devices 118, 120. In the illustrative system 100, the first endpoint device is designated as endpoint device (1) 118 and the second endpoint device is designated as endpoint device (2) 120. However, it should be appreciated that any number of endpoint devices may be connected through the NFV security architecture 116. The endpoint devices 118, 120 are communicatively coupled with the NFV security architecture 116 via a network (not shown), using wired or wireless technology, to form an end-to-end communication system in which the endpoint device (1) can communicate with the endpoint device (2), and vice versa. Accordingly, the NFV security architecture 116 can monitor and process the network communication traffic (i.e., network packets) transmitted between the endpoint devices 118, 120.

The network via which the endpoint devices 118, 120 communicate may be embodied as any type of wired or wireless communication network, including cellular networks, such as Global System for Mobile Communications (GSM) or Long-Term Evolution (LTE), telephony networks, digital subscriber line (DSL) networks, cable networks, local or wide area networks, global networks (e.g., the Internet), or any combination thereof. For example, in some embodiments, the network may be embodied as an NFV-based Long-Term Evolution (LTE) network having a vEPC architecture. It should be appreciated that the network may serve as a centralized network and, in some embodiments, may be communicatively coupled to another network (e.g., the Internet). Accordingly, the network may include a variety of network devices, virtual and physical, such as routers, switches, network hubs, servers, storage devices, compute devices, etc., as needed to facilitate communication between the endpoint devices 118, 120 and the NFV security architecture 116.

Figure 3:
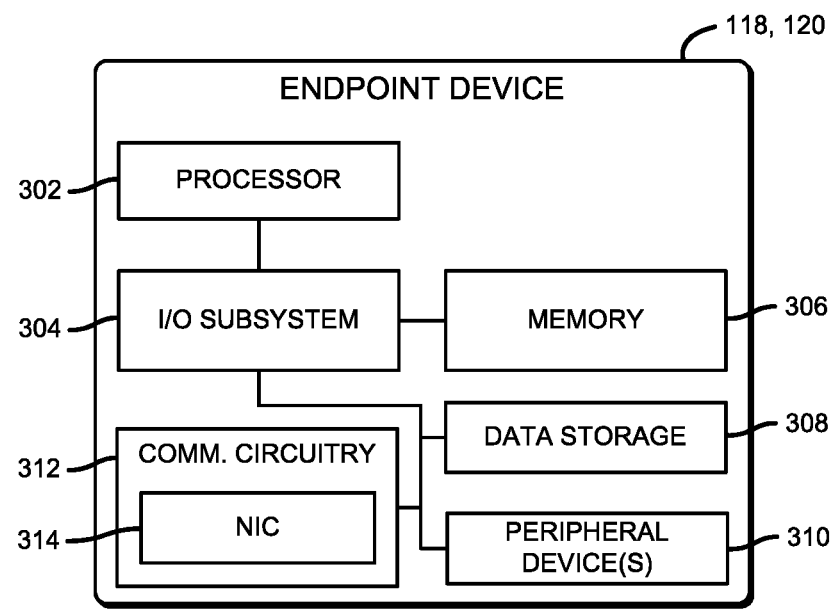
FIG. 3 is a simplified block diagram of at least one embodiment of an endpoint device of the system of FIG. 1.

The endpoint devices 118, 120 may be embodied as any type of computation or computer device capable of performing the functions described herein, including, without limitation, a smartphone, a mobile computing device, a tablet computer, a laptop computer, a notebook computer, a computer, a server (e.g., stand-alone, rack-mounted, blade, etc.), a network appliance (e.g., physical or virtual), a web appliance, a distributed computing system, a processor-based system, and/or a multiprocessor system. As shown in FIG. 3, similar to the computing node 110 of FIG. 2, the illustrative endpoint device (e.g., one of the endpoint devices 118, 120 of FIG. 1) includes a processor 302, an input/output (I/O) subsystem 304, a memory 306, a data storage device 308, one or more peripheral devices 310, and communication circuitry 312. As such, further descriptions of the like components are not repeated herein for clarity of the description with the understanding that the description of the corresponding components provided above in regard to the computing node 110 applies equally to the corresponding components of the endpoint devices 118, 120.

Of course, the endpoint devices 118, 120 may include other or additional components, such as those commonly found in a mobile computing device capable of operating in a telecommunications infrastructure in other embodiments (e.g., various input/output devices). Additionally, in some embodiments, one or more of the illustrative components may be incorporated in, or otherwise form a portion of, another component. The peripheral devices 310 may include any number of input/output devices, interface devices, and/or other peripheral devices. For example, in some embodiments, the peripheral devices 310 may include a display, touch screen, graphics circuitry, keyboard, mouse, speaker system, and/or other input/output devices, interface devices, and/or peripheral devices.

Figure 4:
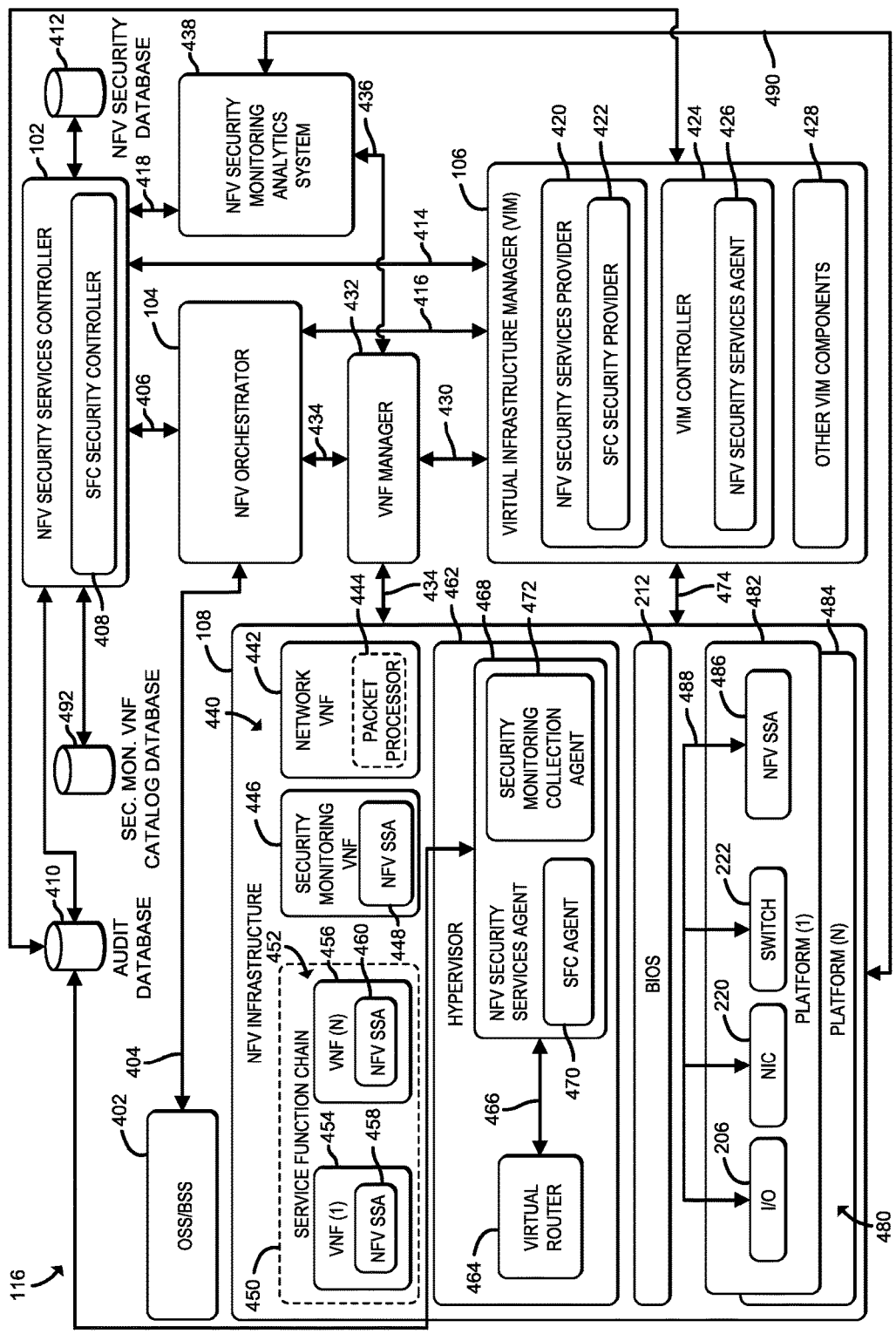
FIG. 4 is a simplified block diagram of at least one embodiment of an NFV security architecture of the system of FIG. 1.

Referring now to FIG. 4, an illustrative embodiment of the NFV security architecture 116 of FIG. 1 for monitoring the security of the NFV security architecture 116 includes the NFV security services controller 102, the NFV orchestrator 104, the VIM 106, and the NFV infrastructure 108 of FIG. 1. Each security monitoring component of the illustrative embodiment 116 includes a globally unique security identifier that uniquely identifies the corresponding security monitoring component. The globally unique security identifier may be based on, for example, a media access control (MAC) address of the security monitoring component, an internet protocol (IP) address assigned to the security monitoring component, an identifier embedded into a secure memory 210 of the security monitoring component (e.g., a BIOS 212 (UEFI) identifier, an identifier of an operating system of the security monitoring component, etc.). The globally unique security identifier may be protected within a physical TPM or a software-based trusted module, such as a firmware TPM on the security engine 224 (e.g., a ME, a converged security and manageability engine (CSME), an innovation engine), a secure partition, a security co-processor or separate processor core, etc.) and/or stored in a secure location (e.g., the secure memory 210). Any of the security monitoring components, or the functionality thereof, may be instantiated in a secure environment (e.g., the TEE supports 204 of the processor 202). As such, every instantiation may be identified by the globally unique security identifier. Further, in some embodiments, the globally unique security identifier may be bound to a use-case messaging upon instantiation.

Additionally, each unique usage instance includes a unique usage identifier. Accordingly, multiple usages and flows within the NFV security architecture 116 can be uniquely identified, such as for auditing, authenticating, controlling, debugging, etc. As described previously, in some embodiments, the NFV security architecture 116 may include one or more instances of the NFV security services controller 102, the NFV orchestrator 104, and the VIM 106. In such embodiments, the multiple instances of the components may be mirrored to use the same external identifier, and additionally include a unique internal identifier (e.g., an instance security identifier) to distinguish between the mirrored components.

Further, each logical component of the NFV security architecture 116 may be segregated into more than one physical and/or logical component(s) to address specific usages, such as SFC policy, inter-VNF communication keys, VIM controller 424 policies, etc. In such embodiments, the physical and/or logical components may be signed along with a globally unique identifier (GUID) by the operator or cloud provider, which may be verified prior to installation. The signing may be performed using a private key, whose public key (e.g., certificate key, fuse key, device specific key, etc.) may be embedded into the NFV infrastructure 108 and accessed by the NFV security services agents. Accordingly, the verification may be performed by the NFV security services agents within strict control of the environment of the physical and/or logical components.

The NFV security services controller 102 is communicatively coupled to the NFV orchestrator 104 via a secure communication channel 406. As discussed above, in some embodiments, the NFV security services controller 102 and the NFV orchestrator 104 may be co-located, such as in the MANO architectural framework. Further, the NFV security services controller 102 is communicatively coupled to the VIM 106 via a secure communication channel 414 and the NFV orchestrator 104 is communicatively coupled to the VIM 106 via a secure communication channel 416. The secure communication channels 406, 414, 416, as well as the other secure communication channels of the NFV security architecture 116, may be protected with secure keys (e.g., session keys and/or other cryptographic keys) used by the NFV security services controller 102 to establish a root of trust (RoT) to establish the communication channels (e.g., the secure communication channels 406, 414, 416) of the NFV security architecture 116. In some embodiments, the secure keys may be embodied as pairwise session keys that may be refreshed periodically. As such, the NFV security services controller 102 can be configured to act as an authentication server.

The NFV security architecture 116 additionally includes an operations support systems and business support systems (OSS/BSS) 402 that is communicatively coupled to the NFV orchestrator 104 via a communication channel 404. The OSS/BSS 402 may be embodied as any type of computation or computing node capable of performing the functions described herein, such as supporting various end-to-end telecommunication services in a telephone network. In some embodiments, the OSS/BSS 402 may be configured to support management functions such as network inventory, service provisioning, network configuration, and fault management, as well as various business functions to support end-to-end telecommunication services that may be supported by the OSS/BSS 402, such as product management, customer management, revenue management, order management, etc.

As described previously, in use, the NFV security services controller 102 provides and enforces security monitoring policies across the various security monitoring components of the NFV security architecture 116. To do so, the NFV security services controller 102 transmits the security monitoring policies to the NFV orchestrator 104 and the VIM 106 across the respective secure communication channels. The NFV security services controller 102 is further communicatively coupled to an NFV security monitoring analytics system 438 via a secure communication channel 418.

The NFV security monitoring analytics system 438, which will be described further below, provides the NFV security services controller 102 with a remediation policy (i.e., an updated security monitoring policy) based on whether the NFV security monitoring analytics system 438 has detected a security threat, such as an attack (e.g., a denial-of-service (DoS) attack, a man-in-the-middle attack, eavesdropping, a data modification attack, etc.) or anomaly, in the analysis of telemetry data received in accordance with the presently enforced security monitoring policy. Accordingly, the NFV security services controller 102 is configured to enforce any updates to the security monitoring policy based on the remediation policy, such as by a corrective action that may be taken to address the threat or validate the anomaly. For example, the corrective action may include blocking certain network traffic (i.e., certain network packets), streaming certain network traffic to a deep packet inspection (DPI) VNF instance, rate limiting or throttling the network traffic, etc. Accordingly, the NFV security services controller 102 may then transmit a security policy update to the NFV security services provider 420 of the VIM 106.

Additionally, the illustrative NFV security services controller 102 interfaces with three logical, secure databases: an audit database 410, an NFV security database 412, and a VSF catalog database. The audit database 410 is embodied as a secure database that includes security audit information relative to the various security monitoring components of the NFV security architecture 116. The security audit information may include configuration change logs, network traces, debug traces, application traces, etc. In the illustrative NFV security architecture 116, the audit database 410 is additionally configured to interface with other network and security monitoring components of the NFV security architecture 116, such as the VIM 106 and the various NFV security services agents distributed across the NFV security architecture 116, which will be discussed in further detail below. In some embodiments, the various security monitoring components of the illustrative NFV security architecture 116 that interface with the audit database 410 may use a secure clock (e.g., the secure clock 216 of FIG. 2) to timestamp the telemetry data received at the audit database 410 for secure storage. Accordingly, the NFV security services controller 102 can audit the telemetry data (i.e., verify and sequence the telemetry data) based on the timestamp of the telemetry data.

The NFV security database 412 is embodied as a secure database used for deploying security monitoring across the NFV security architecture 116 (i.e., across the NFV security architecture 116). Accordingly, the NFV security database 412 may include security data structures, such as NFV subscriber/tenants, SFC policies, SFC path protection policies, controller policies for the VIM 106 (e.g., VIM controller 424), NFV security monitoring policies and configurations, NFV security provisioning credentials (e.g., for protecting SFCs) service functioning chains, inter-VNF policies, one or more cloud operating system security policies, and/or tenant-specific security policies.

The VSF catalog database 492 is embodied as a secure database that includes catalogs of instructions to add and remove security monitoring VNFs, as well as metadata and information about the security monitoring VNFs. In other words, the VSF catalog database 492 can serve as a repository for security monitoring VNFs. It should be appreciated that the VSF catalog database 492 may become available for orchestration upon the security monitoring VNF being "checked-in" to the VSF catalog database 492.

As described previously, in use, the NFV orchestrator 104 manages the lifecycle of the VNFs in the NFV infrastructure 108, including instantiation, scaling-out/in, measuring performance, correlating events, termination, etc. To do so, the NFV orchestrator 104 is configured to provide instructions to a VNF manager 432 via a secure communication channel 434 to manage the initialization and configuration (i.e., scaling and deployment) of the VNFs of the NFV infrastructure 108 (see the VNF instances 440) based on resources of the NFV infrastructure 108. The VNF manager 432 is further configured to perform overall coordination and adaptation for configuration and event reporting for the NFV infrastructure 108. The VNF manager 432 is additionally configured to update and ensure the integrity of the VNFs. To do so, the VNF manager 432 is configured to consult with the VIM 106 via a secure communication channel 430 to determine the available physical resources on which to instantiate particular VNF instances. It should be appreciated that the VIM 106 may make such a determination using any suitable techniques, algorithms, and/or mechanisms. It should be further appreciated that, in some embodiments a single VNF manger 432 may be responsible for managing one or more VNF instances. In other words, in some embodiments, a VNF manager 432 may be instantiated for each of the VNF instances.

As also described previously, in use, the VIM 106 controls and manages the allocation of virtual and hardware compute, storage, and network resources of the NFV infrastructure 108 via messages securely transmitted via a secure communication channel 474. Additionally, the VIM 106 may be configured to collect and securely forward performance measurements and events of the NFV infrastructure 108 compute, storage, and network resources (e.g., physical and virtual) to the audit database 410. The illustrative VIM 106 includes an NFV security services provider 420, a VIM controller 424, and a number of VIM components 428. The NFV security services provider 420 is configured to receive a security monitoring policy from the NFV security services controller 102 via the secure communication channel 414, implement the security monitoring policy across the various security monitoring components of the NFV infrastructure 108, and provision VNF instances (e.g., the service function chain VNFs 452 of the VNF instances 440) based on the security monitoring policy received from the NFV security services controller 102.

Additionally, the NFV security services provider 420 is configured to securely communicate with one or more of the NFV security services agents of the VIM 106 and the NFV infrastructure 108. The VIM controller 424 is configured to function as a network policy controller, or a networking service controller, such as a software defined networking (SDN) controller or an OpenStack Neutron, for example. The VIM components 428 may include any additional physical and/or virtual compute, storage, and network resources of the VIM 106 as may be needed to install the VNF instances and/or activate services, such as VNF image management controllers (e.g., OpenStack Nova for installation and provisioning the VNF instances 440). The illustrative VIM controller 424 includes an NFV security services agent 426 that is configured to collect telemetry data of the VIM controller 424, such as policy based information, as well as from the other VIM components 428.

The NFV infrastructure 108 includes all of the hardware and software components (i.e., virtual compute, storage, and network resources, virtualization software, hardware compute, storage, and network resources, etc.) of the computing nodes 110 from which the VNFs may be deployed. It should be appreciated that the physical and/or virtual components of the NFV infrastructure 108 may span across different locations, data centers, geographies, providers, etc. Additionally, it should be further appreciated that the network through which the components of the NFV infrastructure 108 use to communicate and interface through may be considered to be included in the NFV infrastructure 108.

The illustrative NFV infrastructure 108 includes one or more platforms 480, the BIOS 212 of FIG. 2, a hypervisor 462, and one or more VNF instances 440. The illustrative platforms 480 include a first platform, which is designated as platform (1) 482, and a second platform, which is designated as platform (N) 482 (i.e., the "Nth" platform, wherein "N" is a positive integer and designates one or more additional platforms). Each of the platforms 480 includes the I/O subsystem 206, the NIC 220, and/or the switch 222 of FIG. 2. The illustrative platform (1) 482 additionally includes an NFV security services agent 486. The NFV security services agent 486 is configured to collect telemetry data at a hardware level (i.e., from the I/O subsystem 206, the NIC 220, and/or the switch 222) via a secure communication channel 488. Accordingly, the telemetry data collected by the NFV security services agent 486 may include NIC configuration information, various hardware flaws, errors, and/or anomalies, and network packet behaviors (e.g., dropped packets). Upon collection, the telemetry data is securely transmitted to the NFV security monitoring analytics system 438, such as via a secure communication channel 490.

The hypervisor 462, or virtual machine monitor (VMM), in use, runs the VNF instances 440, generally via one or more virtual machines (VMs) and/or containers for running each of the VNF instances 440. In some embodiments, the VNF instances 440 may include a virtual switch (vSwitch), a virtual router (vRouter), a firewall, a network address translation (NAT), a DPI, an evolved packet core (EPC), a mobility management entity (MME), a packet data network gateway (PGW), a serving gateway (SGW), a billing function, and/or other virtual network function. In some embodiments, a particular VNF instance 440 may have multiple sub-instances, which could be executing on a single platform (e.g., the platform 482) or across different platforms (e.g., the platform 482 and the platform 484). In other words, when virtualized, network functions traditionally handled by physical hardware co-located with a particular platform may be distributed as a number of VNF instances 440 across one or more of the platforms 480. Each of the VNF instances 440 may include any number of VNFs, each of which may include one or more VNF components (VNFCs) (not shown). It should be appreciated that the VNF instances 440 may be embodied as any suitable virtual network functions; similarly, the VNFCs may be embodied as any suitable VNF components. The VNFCs are processes and/or instances that cooperate to deliver the functionality of one or more VNF instances 440. For example, in some embodiments, the VNFCs may be sub-modules of the VNF instances 440.

Similar to the VNF instances 440, it should be appreciated that the VNFCs may be distributed across one or more platforms 480. Further, it should be appreciated that a particular VNF instance 440 may be distributed across multiple platforms 480 and still form a part of a VNF instance 440 established on a one of the platforms 480. In some embodiments, the VNF instances 440 and/or the VNFCs may be executing on the same platform (e.g., the platform 482 or the platform 484) or within the same data center but on different platforms 480. Further, in some embodiments, the VNF instances 440 and/or the VNFCs may be executing across different data centers.

The hypervisor 462 is configured to establish and/or utilize various virtualized hardware resources (e.g., virtual memory, virtual operating systems, virtual networking components, etc.) of the NFV infrastructure 108. Additionally, the hypervisor 462 may facilitate communication across the VNF instances 440 and/or the VNFCs. The illustrative hypervisor 462 includes a virtual router 464 communicatively coupled to an NFV security services agent 468 via a secure communication channel 466. The NFV security services agent 468 is configured to receive and implement the security monitoring policy from the NFV security services controller 102 via the NFV security services provider 420. In other words, the NFV security services agent 468 is configured to perform active and/or passive security monitoring based on the security monitoring policy. Further, the NFV security services agent 468 is configured to, upon activation of the NFV security services agent 468, map network traffic for monitoring and/or collection to the security monitoring policy.

The illustrative NFV security services agent 468 includes an SFC agent, which will be described further below, and a security monitoring collection agent 472. The security monitoring collection agent 472 is configured to collect the telemetry information for the component of the NFV security architecture 116 at which the NFV security services agent resides. In the illustrative NFV security services agent 468, the component is the hypervisor 462, whereas for the NFV security services agent 486, the component is the platform 482. It should be appreciated that while only the NFV security services agent 468 shows the security monitoring collection agent 472 and the SFC agent 470, each of the NFV security services agents (e.g., the NFV security services agent 426, the NFV security services agent 448, the NFV security services agent 458, the NFV security services agent 460, and the NFV security services agent 486) distributed across the NFV security architecture 116 may include an instance of a security monitoring collection agent and/or an SFC agent. The security monitoring collection agent 472 of the NFV security services agent 468 is configured to collect telemetry data at a BIOS level (i.e., at the BIOS 212 and/or the hypervisor 462). The telemetry data collected by the security monitoring collection agent 472 is securely transmitted to the NFV security monitoring analytics system 438, such as via the secure communication channel 490.

The illustrative VNF instances 440 include a network VNF 442 configured to perform as a virtual networking device (e.g., a vSwitch, a vRouter, a firewall, a NAT, a DPI, an EPC, an MME, a PGW, a SGW, etc.), a security monitoring VNF 446 is configured to function as a dedicated monitoring agent, and a service function chain 450 that includes one or more service function chain VNFs 452 capable of performing a particular virtual function or service. It should be appreciated that, in other embodiments, additional and/or alternative VNF instances may be deployed. As such, it should be appreciated that, while the illustrative NFV security architecture 116 of FIG. 4 only shows a single security monitoring VNF 446, a plurality of single security monitoring VNFs 446 may be deployed in other embodiments.

The illustrative service function chain VNFs 452 of the service function chain 450 include a first service function chain VNF, which is designated as VNF (1) 454, and a second service function chain VNF, which is designated as VNF (N) 456 (i.e., the "Nth" service function chain VNF, wherein "N" is a positive integer and designates one or more additional service function chain VNF instances). Further, each of the illustrative service function chain VNFs 452 includes an instance of an NFV security services agent (i.e., an NFV security services agent 458 of the VNF (1) 454 and an NFV security services agent 460 of the VNF (N) 456). Each of the NFV security services agents 458, 460 is configured to collect telemetry data at a virtual environment level (i.e., collect VNF telemetry data from each of the service function chain VNFs 452 on which the NFV security services agent resides). While each of the illustrative service function chain VNFs 452 of the service function chain 450 includes an NFV security services agent 458, 460, it should be appreciated that, some embodiments, a single NFV security services agent (e.g., the NFV security services agent 448 of the security monitoring VNF 446) may be used to monitor and collect the telemetry data.

The network VNF 442 may include a packet processor 444 to process the network traffic at the user data plane, such as the Intel® Data Plane Development Kit (Intel® DPDK). The security monitoring VNF 446 may include an NFV security services agent (SSA) 448 configured to collect telemetry data at the virtual environment level (i.e., collect VNF telemetry data from each of the VNF instances 440). The telemetry data collected by a security monitoring collection agent (not shown) of the NFV security services agent 448 is securely transmitted to the NFV security monitoring analytics system 438, such as via the secure communication channel 490.

The NFV security monitoring analytics system 438 is configured to securely acquire telemetry data relative to the NFV infrastructure 108 from the various NFV security services agents via the secure communication channel 490 and VNF configuration data relative to the VNF manager 432 via the secure communication channel 436. The VNF configuration data may include the number of instantiated NFVs, the number of activated NFVs, the function or service, or portion of function or service, being provided by each NFV, etc. Accordingly, the NFV security monitoring analytics system 438 can analyze the telemetry data and the VNF configuration data to detect whether any threats and/or anomalies are present. In some embodiments, the NFV security monitoring analytics system 438 may analyze the telemetry data and the VNF configuration data to develop telemetry patterns from which security threats may be identified. The NFV security monitoring analytics system 438 is further configured to deliver a remediation policy (i.e., an updated security monitoring policy) to the security monitoring components for enforcement in response to having detected a security threat.

The illustrative NFV security architecture 116 includes a number of security monitoring components specifically configured to monitor the security of service function chains executed within the NFV infrastructure 108. The service function chaining (SFC) security monitoring components include an SFC security controller 408 of the NFV security services controller 102, an SFC security provider 422 of the NFV security services provider 420 of the VIM 106, and a number of SFC agents distributed throughout the NFV infrastructure 108. The SFC security monitoring components of the NFV security architecture 116 are mutually authenticated for secure communication, and may be built upon a secure, verified boot. Accordingly, the SFC security monitoring components of the NFV security architecture 116 can be deployed across different geographies, across different hosting data centers, and/or over untrusted networks. Further, the SFC security monitoring components of the NFV security architecture 116 can be securely provisioned within the NFV security architecture 116.

The SFC security monitoring components can be performed on the control, management, and/or data planes running atop various VNFs, such as within a vEPC architecture, for example. In some embodiments, a runtime SFC-specific security monitoring policy may be triggered by events that occur on one plane, while the security monitoring performed based on the security monitoring policy may be initiated on that plane, and/or one or both of the other planes. For example, an event may be triggered in the control plane, such as by a malicious or malformed network packet, and the remediation policy might include SFC monitoring and network data packet collection for a match of the event-triggering network packet across the control, management, and data planes.

The SFC security controller 408 is configured to orchestrate SFC security policies across NFV infrastructure 108. To do so, the SFC security controller 408 is configured to communicate with the NFV security database 412 to access the SFC security policies and credentials. The SFC security policies and credentials may include any type of security policies such as, for example, transportation policies (i.e., for secure transport of messages, security keys, etc.) and policies for security monitoring aspects at the time of secure provisioning of the VNFs and/or installation at various nodes of the NFV infrastructure 108. The SFC security policies and credentials may additionally include policies for communications across the SFCs and/or internal to the VNFs of the SFCs, such as whether the communications are to be transmitted over hardware of software (i.e., virtual) network interface cards, switches, and/or routers. The SFC security policies and credentials may be based on a flow identifier, a tenant identifier, a subscriber identifier (e.g., an International Mobile Subscriber Identity (IMSI)), a geographic location, a regulatory domain, etc.

In some embodiments, the specific policies may be configured into the SFC security controller 408 through the OSS/BSS 402 and/or an existing security infrastructure, such as a 3rd Generation Partnership Project (3GPP) security infrastructure. It should be appreciated that, in some embodiments, for run-time policies (e.g., monitoring certain subscriber flows, tenants, application tags, etc.), the policies may be delivered using the existing security infrastructure.

As described previously, the security monitoring components of the NFV security architecture 116 may be mutually authenticated. In other embodiments, the SFC security controller 408 may deliver the security keys between the SFC agents and/or other telemetry gathering components. Additionally or alternatively, in some embodiments, the existing security infrastructure may also deliver the security keys that may be used for various inter-VNF or per-SFC communication or policy enforcement. Additionally, the SFC security controller 408 is further configured to securely provide the SFC security policies to one or more SFC security providers 422 via the secure communication channel 414.

Similar to the NFV security services controller 102, the SFC security controller 408 is configured to securely receive a remediation security monitoring policy from the NFV security monitoring analytics system 438 based on analyzed telemetry data received at the NFV security monitoring analytics system 438, the process for which is described further below. Also similar to the remediation policy received by the NFV security services controller 102, the remediation security monitoring policy received by the SFC security controller 408 may include a corrective action to take on the network traffic suspected by the NFV security monitoring analytics system 438 based on the analysis of the telemetry data performed by the NFV security monitoring analytics system 438. The corrective action may include blocking certain network traffic, streaming certain network traffic to a deep packet inspection (DPI) VNF instance, rate limiting or throttling the network traffic, or any other action that may be taken on suspected network traffic to further identify a root cause or validate the security threat.

The SFC security controller 408 is further configured to deliver a security monitoring policy update to one or more SFC security providers 422 of the illustrative NFV security services provider 420 that are communicatively coupled to the SFC security controller 408. The SFC security provider 422 is configured to transmit the security monitoring policy update across the various network and security monitoring components of the VIM 106, including the VIM controller 424. The SFC security provider 422 is additionally configured to transmit the security monitoring policy update, including any appropriate security monitoring actions, across the various SFC agents within the NFV security services agents that are distributed throughout the NFV infrastructure 108.

While the illustrative NFV infrastructure 108 only includes the SFC agent 470 of the NFV security services agent 468, it should be appreciated that an SFC agent may be instantiated within any one or more of the NFV security services agents distributed throughout the NFV infrastructure 108. The SFC agents (e.g., the SFC agent 470) are configured to communicate with various security monitoring components of the NFV infrastructure 108 to perform extraction of telemetry data and securely deliver the extracted telemetry data based on the security monitoring policy. The telemetry data extraction (i.e., collection) can be initiated using appropriate hooks within the NFV infrastructure 108, such as at an Open vSwitch, an Open vRouter, the DPDK, a hardware NIC (e.g., the NIC 220), a hardware switch (e.g., the switch 222, or a hardware router, etc., that are connected with the SFC agent.

It should be appreciated that, similar to the security monitoring collection agent 472 of the illustrative NFV security services agent 468, each of the SFC agents may additionally include a collection agent (not shown) specific to that SFC agent and/or rely on the security monitoring collection agent of the NFV security services agent on which the SFC agent resides, which are not shown to preserve clarity of the illustration. In other words, the telemetry data extracted during passive and/or active security monitoring by the SFC agent may be collected by a collection agent of the SFC agent (e.g., a modified sFlow, etc.) running on the NFV infrastructure 108.

As discussed above, the telemetry data may be embodied as any type of data on which a security analysis may be performed. For example, the telemetry data may include security statistics, as well as configuration and health data from the various hardware resources (e.g., compute, storage, and network), virtualization software, and virtual resources (e.g., compute, storage, and network) within the NFV infrastructure 108. Additionally or alternatively, the telemetry data may include complete or partial (e.g., a header, a payload, etc.) network packets of a specific flow (i.e., determined by an identifier of a particular flow to be monitored and/or collected for packaging and transmission), a device, a node, an administrative domain, a geography, and/or any administratively configured flow, etc. To do so, the SFC agent may be provided with an identifier that uniquely identifies the network packet, the device, the node, the geography, etc. Further, the telemetry data may be specific to a particular SFC, consolidates SFC flows, or tunneled SFC flows, for example. Additionally or alternatively, the telemetry data may include full SFC traffic packet flows or a subset of SFC traffic packet flows, such as virtual local area network (VLAN) and layer two (L2) or layer three (L3) tunneled packets.

The SFC agents may extract telemetry data from any security monitoring components and/or communication channels of the NFV infrastructure 108, such as a secure VM, physical layer NICs, switches, routers, and/or fabrics. For example, in some embodiments, an SFC agent instantiated and activated within an NFV security services agent of one of the VNF instances 440 (e.g., the NFV security services agent 448, NFV security services agent 458, or NFV security services agent 460) may communicate with an Intel® DPDK user plane application (e.g., a vSwitch, a vRouter, EPC systems, etc.) to extract telemetry data. In another example, in some embodiments, the SFC agent 470 may communicate with the virtual router 464 (e.g., an Open vSwitch of the virtual router 464) to extract telemetry data.

In use, the SFC agents package and securely deliver the telemetry data to the NFV security monitoring analytics system 438 via the secure communication channel 490. The SFC security controller 408 provides and configured protection credentials are received from and configured by the between the various SFC agents and the NFV security monitoring analytics system 438. To do so, the SFC agents may use manual key provisioning, pre-shared keys, and/or bootstrapping using another mutual authentication function of the SFC security controller 408. Further, the communication channel 490 can be protected by one or more secure keys, such as a unique pairwise random key session that has a configured reasonably finite key lifetime.

Figure 5:
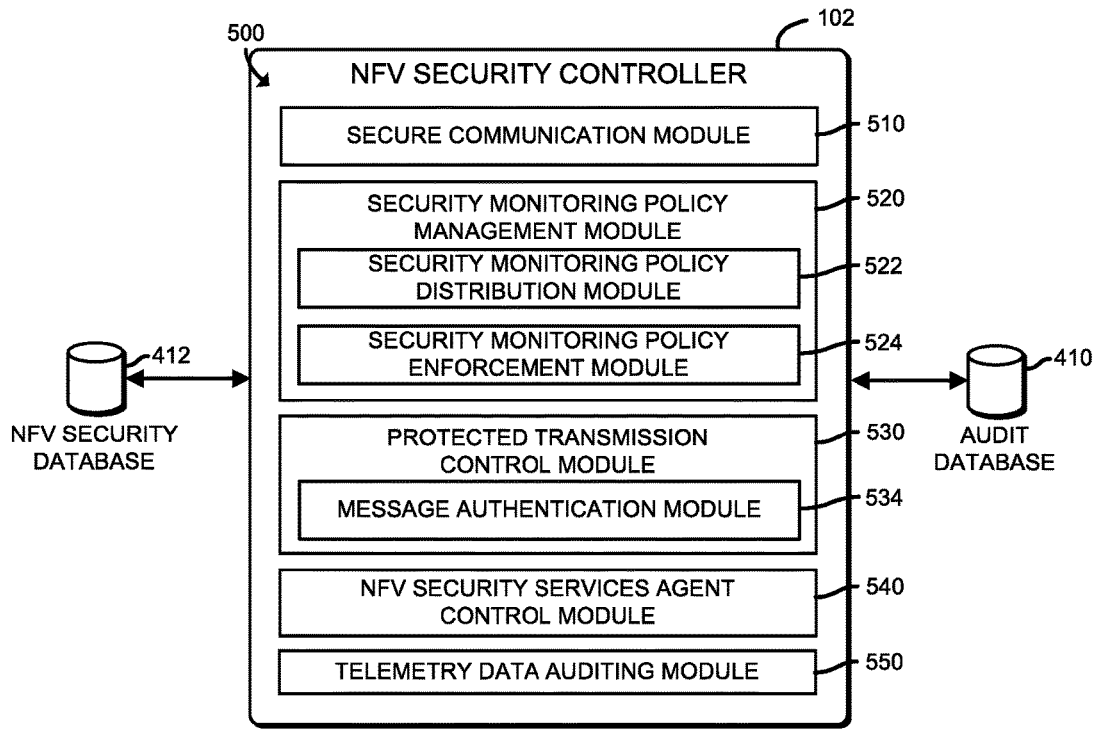
FIG. 5 is a simplified block diagram of at least one embodiment of an environment of an NFV security services controller of the NFV security architecture of FIGS. 1 and 4.

Referring now to FIG. 5, in use, the NFV security services controller 102 establishes an environment 500 during operation. The illustrative environment 500 of the NFV security services controller 102 includes a secure communication module 510, a security monitoring policy management module 520, a protected transmission control module 530, an NFV security services agent control module 540, and a telemetry data auditing module 550. The illustrative environment 500 is communicatively coupled to the audit database 410, which stores security audit information, and the NFV security database 412 of FIG. 4, which stores the security monitoring policy. Each of the modules, logic, and other components of the environment 500 may be embodied as hardware, firmware, software, or a combination thereof. For example, the various modules, logic, and other components of the environment 500 may form a portion of, or otherwise be established by hardware components of the NFV security services controller 102. As such, in some embodiments, any one or more of the modules of the environment 500 may be embodied as a circuit or collection of electrical devices (e.g., a secure communication circuit, a security management circuit, a protected transmission control circuit, an NFV security services agent control circuit, and a telemetry data auditing circuit etc.). Additionally or alternatively, in some embodiments, one or more of the illustrative modules may form a portion of another module and/or one or more of the illustrative modules and/or submodules, which may be embodied as standalone or independent modules.

The secure communication module 510 is configured to facilitate the secure transmission of data (e.g., messages, security monitoring policies, etc.) to and from the NFV security services controller 102. To do so, the secure communication module 510 is configured to securely receive security policy information from external security systems (e.g., from an external security controller, the OSS/BSS 402 of FIG. 4, etc). Additionally, the secure communication module 510 is configured to receive a remediation security policy from the NFV security monitoring analytics system 438 via the secure communication channel 418.

The secure communication module 510 is further configured to securely transmit an updated security policy to the NFV security services provider 420 via the secure communication channel 414. Similarly, the secure communication module 510 is configured to facilitate secure transmission of data between the NFV security services controller 102 and the NFV security database 412, as well as the NFV security services controller 102 and the audit database 410. For all of the secure messages transmitted by the secure communication module 510, the secure communication module 510 includes a unique identifier of the instance of the NFV security services controller 102 that is performing the transmission, as well as an authentication key. To do so, the secure communication module 510 may perform various key management functions, cryptographic functions, secure communication channel management, and/or other security functions, such as using pairwise session keys that are refreshed periodically. Accordingly, the security monitoring component that receives the message can authenticate the message via the NFV security services controller 102.

The security monitoring policy management module 520 is configured to orchestrate the management of the security monitoring policy across the NFV security architecture 116 based on the received security monitoring policy. To do so, the security monitoring policy management module 520 includes a security monitoring policy distribution module 522 and a security monitoring policy enforcement module 524. The security monitoring policy distribution module 522 is configured to transmit the security monitoring policy, which includes security monitoring component policies, configurations, and functions, to various security monitoring components throughout the NFV security architecture 116, such as to the NFV security services agents distributed across the NFV security architecture 116.

The security monitoring policy enforcement module 524 is configured enforce the security monitoring policies transmitted to the various security monitoring components of the NFV security architecture 116. To do so, the security monitoring policy enforcement module 524 is configured to enforce the security monitoring policy by verifying that the NFV security services agents are configured in accordance with the security monitoring policy, as well as monitoring and collecting telemetry data in accordance with the security monitoring policy. For example, the security monitoring policy enforcement module 524 may be configured to verify the security monitoring policy at the VNF instances of the NFV infrastructure 108, such as at VNF runtime or at on-boarding of the VNF at the NFV infrastructure 108 to ensure the VNF instances are configured correctly and that the NFV security services agents presently running thereon are monitoring and collecting telemetry data that is consistent with the security monitoring policy. Additionally, the security monitoring policy enforcement module 524 may verify the topology of a service function chain (e.g., the service function chain 450 of FIG. 4) that includes a plurality of VNF instances (e.g., the service function chain VNFs 452 of the service function chain 450) based on the security monitoring policy.

The protected transmission control module 530 is configured to set up protected transmission policies (e.g., apply security for secure communication channel protection) for the VNFs, such as the service function chain VNFs 452 of the service function chain 450. As described previously, the NFV security services controller 102 may be configured to act as an authentication server to protect the secure communication channels. Accordingly, the protected transmission control module 530 may additionally include a message authentication module 534 configured to perform as an authentication server (i.e., perform authentication on the messages transmitted and received throughout the secure communication channels of the NFV security architecture 116. For example, the protected transmission control module 530 may utilize one or more secure keys (e.g., fuse keys, session keys, or any type of cryptographic keys) to establish a root of trust (RoT) to secure the communication channels (e.g., via a shared memory). In some embodiments, the secure keys may be embodied as pairwise session keys that may be refreshed periodically. Similarly, the protected transmission control module 530 is configured to protect the secure communication channels between the security monitoring components and the audit database 410.

The NFV security services agent control module 540 is configured to manage NFV security services agents (see FIG. 4), which are configured to deliver various security functions throughout the VIM 106 and the NFV infrastructure 108. To do so, the NFV security services agent control module 540, prior to booting of the NFV security services agents, seeds the appropriate security and policy configuration information, which may be extracted by the NFV security services agents at runtime, to perform particular tasks, such as to connect to the appropriate VNF manager. For example, in an embodiment wherein the NFV security architecture 116 includes a number of instantiated VNFs of a service function chain (e.g., the service function chain VNFs 452 of the service function chain 450), the NFV security services agent control module 540 is configured to activate the VNFs of the service function chain, initiate deployment (i.e., spin-up and instantiation) of the NFV security services agents by executing a bootstrap of an NFV security services agent on one or more of the VNFs of the service function chain, and receive bootstrap information (e.g., bootstrap configuration parameters that may be used by the bootstrap to instantiate the NFV security services agent, personalization information for that particular NFV security services agent instance, and/or license information of the NFV security services agent instance, etc.).

The NFV security services agent control module 540 is further configured to notify the corresponding VNF manager 432 of an instantiated NFV security services agent. The NFV security services agents may be configured to perform a mutually authenticated key exchange for establishing the secure communication channel with the protected transmission control module 530, which the NFV security services agent control module 540 can use to personalize the NFV security services agents (e.g., set name, security policy groups, per-tenant policies, distribute key material for secure session establishment with the VNF manager 432 of the VNF instance on which a particular NFV security services agent resides, etc.).

The telemetry data auditing module 550 is configured to perform an audit on the telemetry data stored at the audit database 410. To do so, the telemetry data auditing module 550 is configured to analyze a timestamp associated with the telemetry data. As described previously, the telemetry data is timestamped by a secure clock (e.g., the secure clock 216 of FIG. 2) prior to being transmitted to the audit database 410. Accordingly, the telemetry data auditing module 550 is further configured to verify and sequence the telemetry data as part of the audit.

Figure 6:
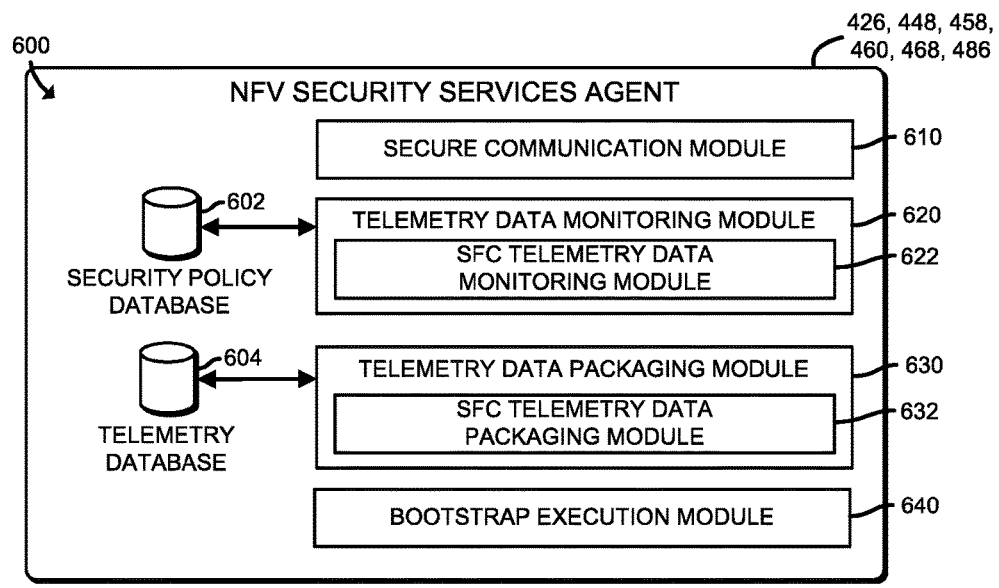
FIG. 6 is a simplified block diagram of at least one embodiment of an environment of an NFV security services agent of the NFV security architecture of FIG. 4.

Referring now to FIG. 6, in use, each NFV security services agent (e.g., NFV security services agents 426, 448, 458, 460, 468, 486 of FIG. 4) establishes an environment 600 during operation. The illustrative environment 600 of the corresponding NFV security services agent includes a secure communication module 610, a telemetry data monitoring module 620, a telemetry data packaging module 630, and a bootstrap execution module 640. The illustrative environment 600 additionally includes a security policy database 602 in which to store the security monitoring policy at the NFV security services agent and a telemetry database 604 in which to store the telemetry data at the NFV security services agent. It should be appreciated that, in some embodiments, the security monitoring policy and/or the telemetry data may be stored external to the NFV security services agent, such as in the NFV security database 412 and/or audit database 410, for example.

Each of the modules, logic, and other components of the environment 600 may be embodied as hardware, firmware, software, or a combination thereof. For example, the various modules, logic, and other components of the environment 600 may form a portion of, or otherwise be established by hardware components of the NFV security services agent. As such, in some embodiments, any one or more of the modules of the environment 600 may be embodied as a circuit or collection of electrical devices (e.g., a secure communication circuit, a telemetry data monitoring circuit, a telemetry data packaging circuit, and a bootstrap execution circuit, etc.). Additionally or alternatively, in some embodiments, one or more of the illustrative modules may form a portion of another module and/or one or more of the illustrative modules and/or submodules may be embodied as a standalone or independent module.

The secure communication module 610 is configured to facilitate the secure transmission of data (e.g., messages, telemetry data, etc.) to and from the NFV security services agent. For example, as shown in FIG. 4, the NFV security services agents of the NFV infrastructure 108 are configured to transmit telemetry data to the NFV security monitoring analytics system 438 and the audit database 410 using protection credentials provided by the NFV security services controller 102. The telemetry data monitoring module 620 is configured to monitor telemetry data of the component and/or level at which the NFV security services agent is located. The telemetry data monitoring module 620 is additionally configured to monitor the telemetry data actively and/or passively. The telemetry data may include virtual and/or physical configuration data, as well as security statistics, complete network packets, network packet headers, or all network packets associated with a particular flow, a specific device, a specific evolved Node B (a.k.a., E-UTRAN Node B, eNodeB, and eNB), a particular geography, or any administratively configured flow.

The telemetry data packaging module 630 is configured to collect and package telemetry data, such as the telemetry data monitored at the telemetry data monitoring module 620. Accordingly, the collected and packaged telemetry data may be any type of data, including information of the hardware resources (e.g., compute, storage, and network), virtualization software, and/or virtual resources (e.g., compute, storage, and network) of the NFV infrastructure 108 or the VIM 106, such as VNF configuration settings, I/O subsystem 206 settings, NIC 220 settings, switch 222 settings, virtual router 464 settings, virtual switch settings, virtual gateway settings, vEPC settings, controller settings, network traffic information, complete and/or partial network packets, etc. Further, the telemetry data packaging module 630 is configured to securely deliver the packaged telemetry data to a dedication analytics system (e.g., the NFV security monitoring analytics system 438 of FIG. 4), such as via the secure communication module 610.

The telemetry data monitoring module 620 and/or the telemetry data packaging module 630 may additionally include agent-specific sub-modules to monitor and/or collect particular telemetry data. For example, the illustrative telemetry data monitoring module 620 includes an SFC telemetry data monitoring module 622 to monitor telemetry data specific to a service function chain of the NFV infrastructure 108 (e.g., the service function chain 450). Similarly, the illustrative telemetry data packaging module 630 includes an SFC telemetry data packaging module 632 to collect and package telemetry data specific to the service function chain of the network infrastructure being monitored, such as by the SFC telemetry data monitoring module 622. Additionally, the telemetry data packaging module 630 and the SFC telemetry data packaging module 632 are each configured to use a secure clock (e.g., the secure clock 216 of FIG. 2) to timestamp the telemetry data for transmission to the audit database 410 for secure storage.

The bootstrap execution module 640 is configured to run a bootstrap to deploy the NFV security services agent, which loads the NFV security services agent on a computing node (e.g., one of the computing nodes 110). The bootstrap execution module 640 is further configured to run the bootstrap on any of the network processing components of the NFV security architecture 116, including a VNF instance (e.g., one of the service function chain VNFs 452 of the service function chain 450), the hypervisor 462, and one of the platforms 480, for example.

Figure 7:
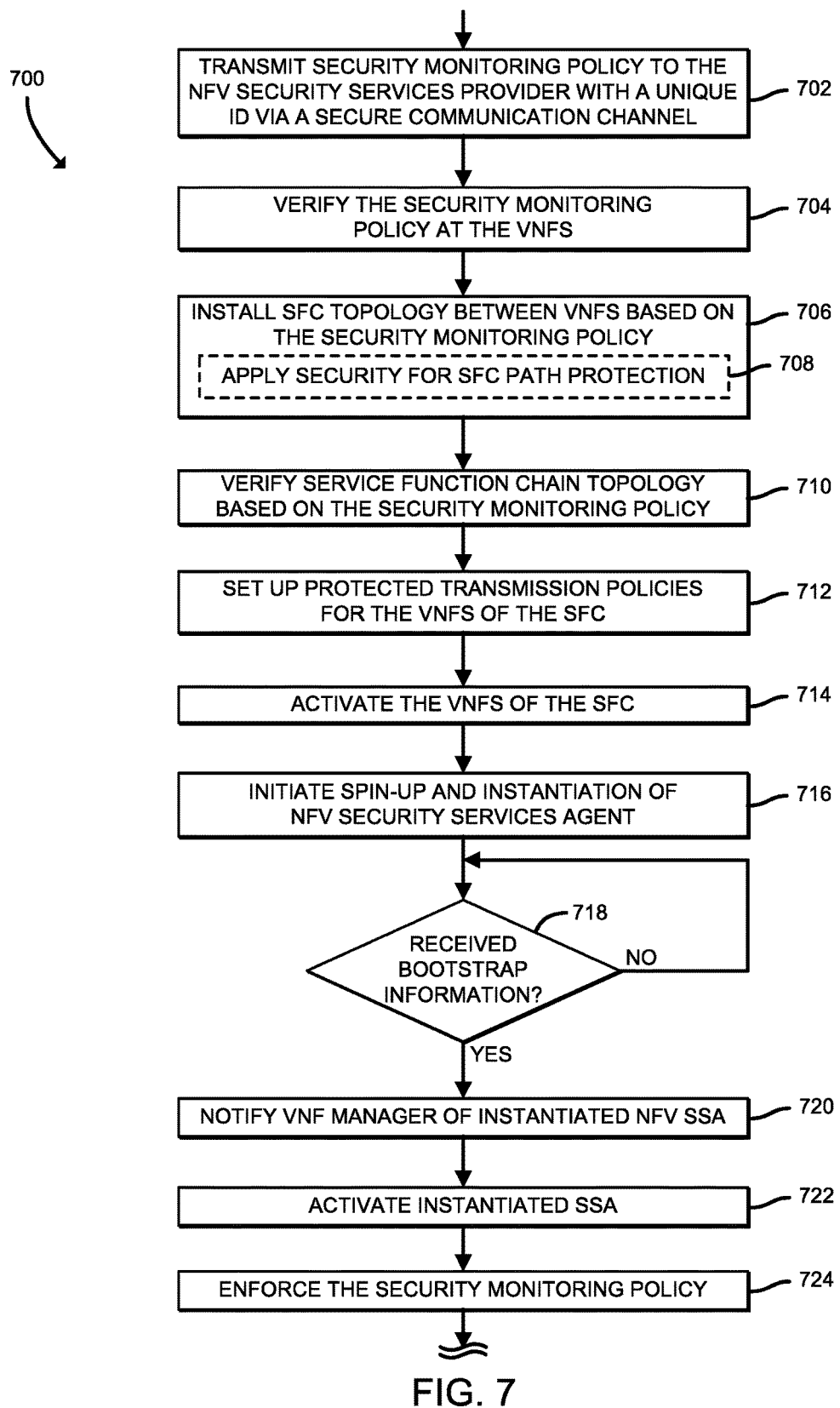
FIG. 7 is a simplified flow diagram of at least one embodiment of a method for managing security monitoring services that may be executed by the NFV security services controller of FIG. 5.

Referring now to FIG. 7, in use, the NFV security services controller 102 may execute a method 700 for managing security monitoring services of the NFV security architecture 116. The method 700 begins at block 702, in which the NFV security services controller 102 transmits a security monitoring policy to the VNFs that have been instantiated within the NFV infrastructure 108 via a secure communication channel (e.g., the communication channel 414 of FIG. 4 to the VIM 106). As described previously, the security monitoring policy includes various monitoring rules, which the VNFs use to determine which telemetry data to monitor and how to configure the resources and functionality of the VNFs. In use, the NFV security services controller 102 transmits the security monitoring policy over the secure communication channel 414 to the NFV security services provider 420 with an identifier that uniquely identifies the NFV security services controller 102. In some embodiments, the NFV security services controller 102 may receive the security monitoring policy from an external source, such as an external controller or the OSS/BSS 402 of FIG. 4 via the NFV orchestrator 104.

At block 704 the NFV security services controller 102 verifies the security monitoring policy at the VNFs. For example, the NFV security services controller 102 may verify the security monitoring policy at VNF runtime or at VNF on-boarding at the NFV infrastructure 108. At block 706, the NFV security services controller 102 installs an SFC topology between multiple VNFs, including paths (i.e., communication paths) therebetween, based on the security monitoring policy. In some embodiments, the NFV security services controller 102 may, at block 708, apply security for the paths to protect the communications transmitted across the paths based on the security monitoring policy.

At block 710, the NFV security services controller 102 verifies the SFC topology based on the security monitoring policy to ensure compliance with the security monitoring policy. At block 712, the NFV security services controller 102 sets up protected transmission policies for the VNFs of the SFC (e.g., the service function chain VNFs 452 of the service function chain 450 of FIG. 4). At block 714, the NFV security services controller 102 activates each of the VNFs of the SFC. To do so, the NFV security services controller 102 may transmit an activation signal via a secure communication channel to each of the VNFs. Additionally, the activation signal, similar to other signals (i.e., messages) transmitted from the NFV security services controller 102 that require authentication, includes the unique identifier such that the VNFs can authentication the activation signal.

At block 716, the NFV security services controller 102 initiates the deployment (i.e., spin-up and instantiation) of an NFV security services agent. To do so, the NFV security services controller 102 executes a bootstrap for the NFV security services agent. As described previously, NFV security services agents may be distributed throughout the VIM 106 and/or the NFV infrastructure 108 to perform the security monitoring operation. Accordingly, the NFV security services agent may be instantiated at a number of the security monitoring components of the NFV security architecture 116 of FIG. 4, such as one of the VNFs of the SFC.

At block 718, the NFV security services controller 102 determines whether bootstrap information was received from the instantiated NFV security services agent. If not, the method 700 loops back to block 718 to continue to wait for the bootstrap information to be received from the instantiated NFV security services agent. If the NFV security services controller 102 determines that the bootstrap information was received from the instantiated NFV security services agent, the method 700 advances to block 720, wherein the NFV security services controller 102 notifies a manager of the VNF in which the NFV security services agent was instantiated. The notification includes a unique identifier that corresponds to the instance of the VNF and another unique identifier that corresponds to the instance of the NFV security services agent. Accordingly, the VNF manager can then communicate with and manage the instantiated NFV security services agent based on the unique identifiers. At block 722, the NFV security services controller 102 activates the instantiated NFV security services agent. At block 724, the NFV security services controller 102 enforces the security monitoring policy across the NFV security services agents distributed throughout the VIM 106 and/or the NFV infrastructure 108.

Figure 8:
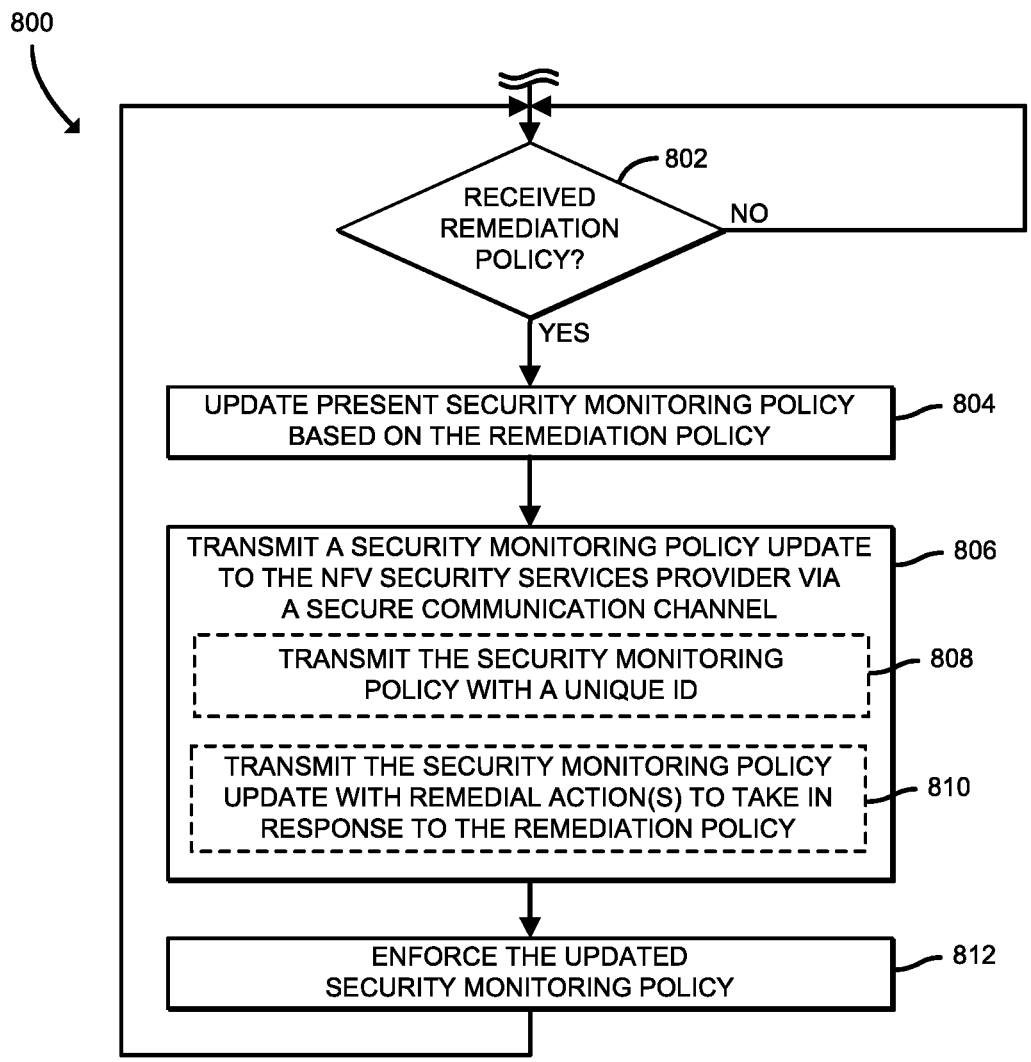
FIG. 8 is a simplified flow diagram of at least one embodiment of a method for updating a security monitoring policy that may be executed by the NFV security services controller of FIG. 5.

Referring now to FIG. 8, in use, the NFV security services controller 102 may execute a method 800 for updating a security monitoring policy. The method 800 begins at block 802, in which the NFV security services controller 102 determines whether a remediation policy was received from the NFV security monitoring analytics system 438. As described previously, the NFV security services agents distributed throughout the VIM 106 and/or the NFV infrastructure 108 are configured to collect telemetry data, which is securely transmitted to the NFV security monitoring analytics system 438 for analysis to determine whether any threats and/or anomalies are detected. Accordingly, in the event that the NFV security monitoring analytics system 438 detects such a security threat (e.g., an attack or an anomaly), the NFV security monitoring analytics system 438 securely transmits a remediation policy directed toward resolving or further analyzing the detected security threat that triggered the remediation policy. If the NFV security services controller 102 determines that the remediation policy was not received, the method 800 loops back to block 802 until the remediation policy is received.

If the NFV security services controller 102 received the remediation policy, at block 804, the NFV security services controller 102 updates the present security monitoring policy based on the remediation policy received at block 802. At block 806, the NFV security services controller 102 transmits a security monitoring policy update to the NFV security services provider 420 via a secure communication channel (e.g., the communication channel 414 of FIG. 4 to the VIM 106). Accordingly, the security monitoring policy update can then be further transmitted from the NFV security services provider 420 to the NFV security services agents distributed throughout the VIM 106 and/or the NFV infrastructure 108.

In some embodiments, at block 808, the NFV security services controller 102 additionally transmits an identifier unique to the NFV security services controller 102 with the security monitoring policy to the NFV security services provider 420 via the secure communication channel. Additionally or alternatively, in some embodiments, at block 810, the NFV security services controller 102 additionally transmits one or more corrective actions to be taken in response to the remediation policy with the security monitoring policy to the NFV security services provider 420 via the secure communication channel. For example, the corrective action(s) may include blocking certain network traffic, streaming certain network traffic to a deep packet inspection (DPI) VNF instance, rate limiting or throttling the network traffic, etc. At block 812, the NFV security services controller 102 enforces the updated security monitoring policy across the NFV security services agents distributed throughout the VIM 106 and/or the NFV infrastructure 108.

Figure 9:
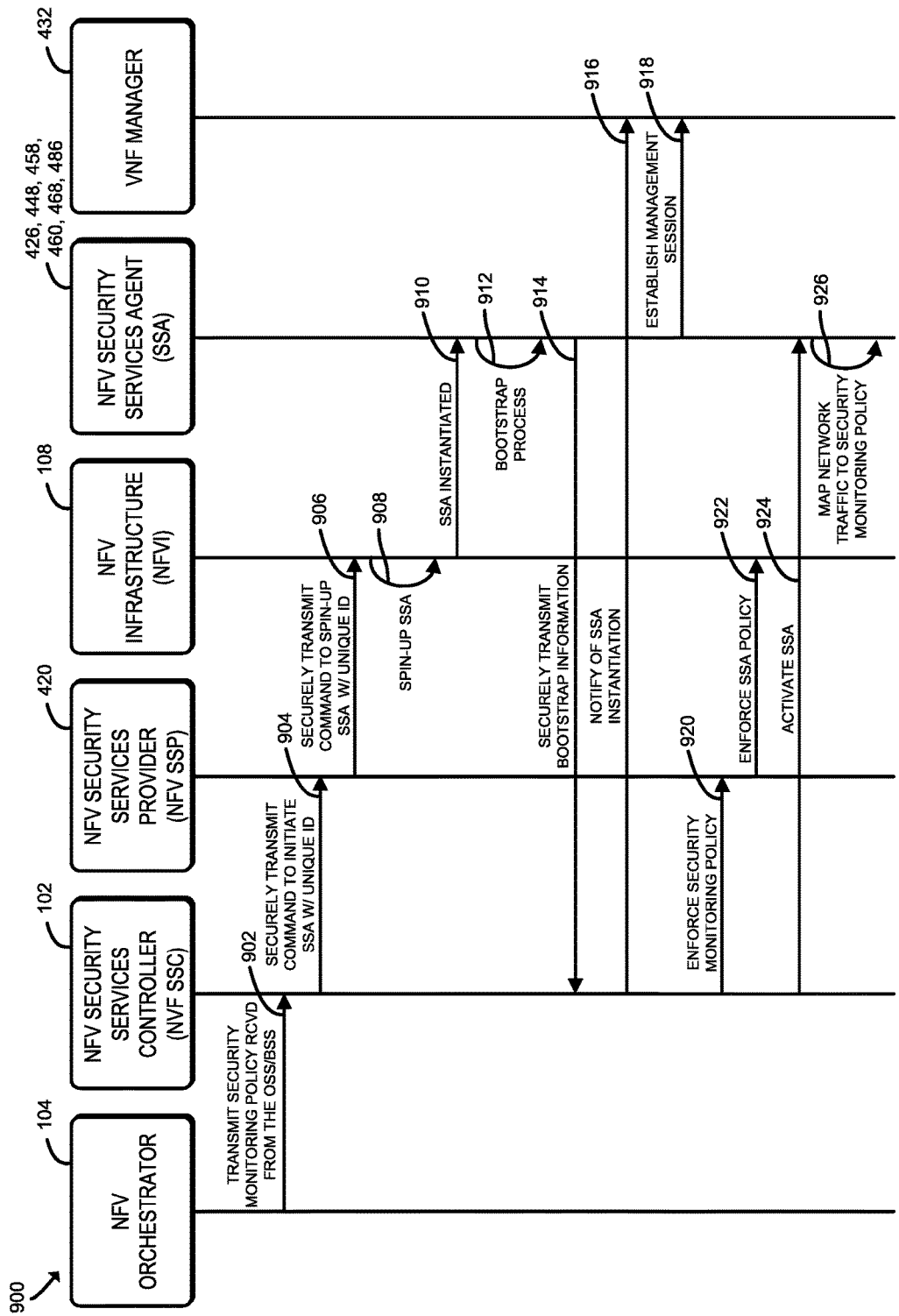
FIG. 9 is a simplified flow diagram of at least one embodiment of a communication flow for initializing one of the NFV security services agents of FIG. 4.

Referring now to FIG. 9, an embodiment of a communication flow 900 for initializing an NFV security services agent includes various security monitoring components of the NFV security architecture 116 of FIG. 4. The illustrative communication flow 900 includes the NFV orchestrator 104, the NFV security services controller 102, the NFV security services provider 420, the NFV infrastructure 108, one of the NFV security services agents (e.g., the NFV security services agent 426, the NFV security services agent 448, the NFV security services agent 458, the NFV security services agent 460, and the NFV security services agent 486), and the VNF manager 432. The illustrative communication flow 900 additionally includes a number of data flows, some of which may be executed separately or together, depending on the embodiment.

The data flows 902 through 910 provide a sequence of data flows for provisioning security monitoring of the NFV security architecture 116 using security monitoring VNF instances within the NFV security architecture 116. At data flow 902, the NFV orchestrator 104 transmits a security monitoring policy, received from the OSS/BSS 402, to the NFV security services controller 102. At data flow 904, the NFV security services controller 102 securely transmits a command with a unique identifier of the NFV security services controller to the NFV security services provider 420 to instantiate an NFV security services agent. At data flow 906, the NFV security services provider 420 securely transmits a command with a unique identifier of the NFV security services controller and/or the NFV security services provider to the NFV infrastructure 108 to deploy (i.e., spin-up and instantiate) an NFV security services agent.

At data flow 908, the NFV infrastructure 108 spins up the NFV security services agent. As described previously, the NFV security services agents may be spun-up at various locations within the NFV infrastructure 108, including NFVs (e.g., the NFV security services agent 448, the NFV security services agent 458, and the NFV security services agent 460), the hypervisor 462 (e.g., the NFV security services agent 468), and the platforms 480 (e.g., the NFV security services agent 486). At data flow 910, the NFV security services agent is instantiated (i.e., a bootstrap of the NFV security services agent is initiated).

The data flows 912 through 916 provide a sequence of data flows for seeding information upon security function start-up and personalizing NFV security services agents. At data flow 912, the NFV security services agent undergoes the bootstrap execution process. At data flow 914, the NFV security services agent securely transmits bootstrap information to the NFV security services controller 102. At data flow 916, the NFV security services controller 102 notifies the VNF manager 432 that is responsible for managing the NFV security services agent. The notification may include a unique identifier that corresponds to the instance of the NFV security services agent, as well as that another unique identifier corresponds to the component on which the NFV security services agent (e.g., one of the service function chain VNFs 452 of the service function chain 450, the hypervisor 462, one of the platforms 480, etc.).

The data flows 918 through 922 provide a sequence of data flows for defining a security policy association between the VNFs and the security monitoring VNFs. At data flow 918, the instantiated NFV security services agent establishes a management session with the VNF manager 432. To do so, the NFV security services agent may establish the management session with the VNF manager 432 using a provided unique identifier of the VNF manager 432, such as an internet protocol (IP) address, a domain name server (DNS), a fully qualified domain name (FQDN), a uniform resource locator (URL), etc., and an initial root security credential that uniquely identifies and may be used in a mutual authentication between the NFV security services agent and the VNF manager 432.

At data flow 920, the NFV security services controller 102 enforces the security monitoring policy (various protocol types, tunnels, etc.) at the NFV security services provider 420. It should be appreciated that the mapping of the policies at the NFV security services controller 102 can be done by one of a system administrator, a security administrator, a tenant, a machine learning engine, and/or any other technology and/or authorized personnel. At data flow 922, the NFV security services provider 420 enforces a NFV security services agent portion of the security monitoring policy at the NFV security services agent.

The data flows 924 and 926 provide a sequence of data flows for mapping workload traffic to the security policy. For example, the NFV security services agent may interact with a virtual switch to translate mapping of a VNF group to the security policy before handing off traffic to the security monitoring VNF instance. In such embodiments, the VNF group may be based on a workload traffic type (e.g. VLAN, multiprotocol label switching (MPLS), general packet radio service (GPRS) tunneling protocol (GTP), etc.) and associated security policies to be enforced by the security monitoring VNFs. Accordingly, the mapping may change due to any number of reasons, including new tenants joining, existing tenants leaving, traffic engineering, workload balancing, etc. As a result, the OSS/BSS system may convey such changes to the NFV security services controller 102. As such, NFV security services controller 102 may then automate the distribution of the new security policy to the NFV security services agents (e.g., the NFV security services agent of the security monitoring VNFs).

At data flow 924, the NFV security services controller 102 activates the NFV security services agent. To do so, the NFV security services controller 102 provides an activation signal to the NFV security services agent via a secure communication channel. Additionally, consistent with other messages transmitted by the NFV security services controller 102 that need to be authenticated, the activation signal may include the unique identifier. At data flow 926, the NFV security services agent maps network traffic to the security monitoring policy. Accordingly, the NFV security services agent can monitor and collect telemetry data in accordance with the security monitoring policy. It should be appreciated that checking of the network traffic mapping may be performed by the NFV security services controller 102 based on the security policies delivered to the NFV security services agent.

Figure 10:
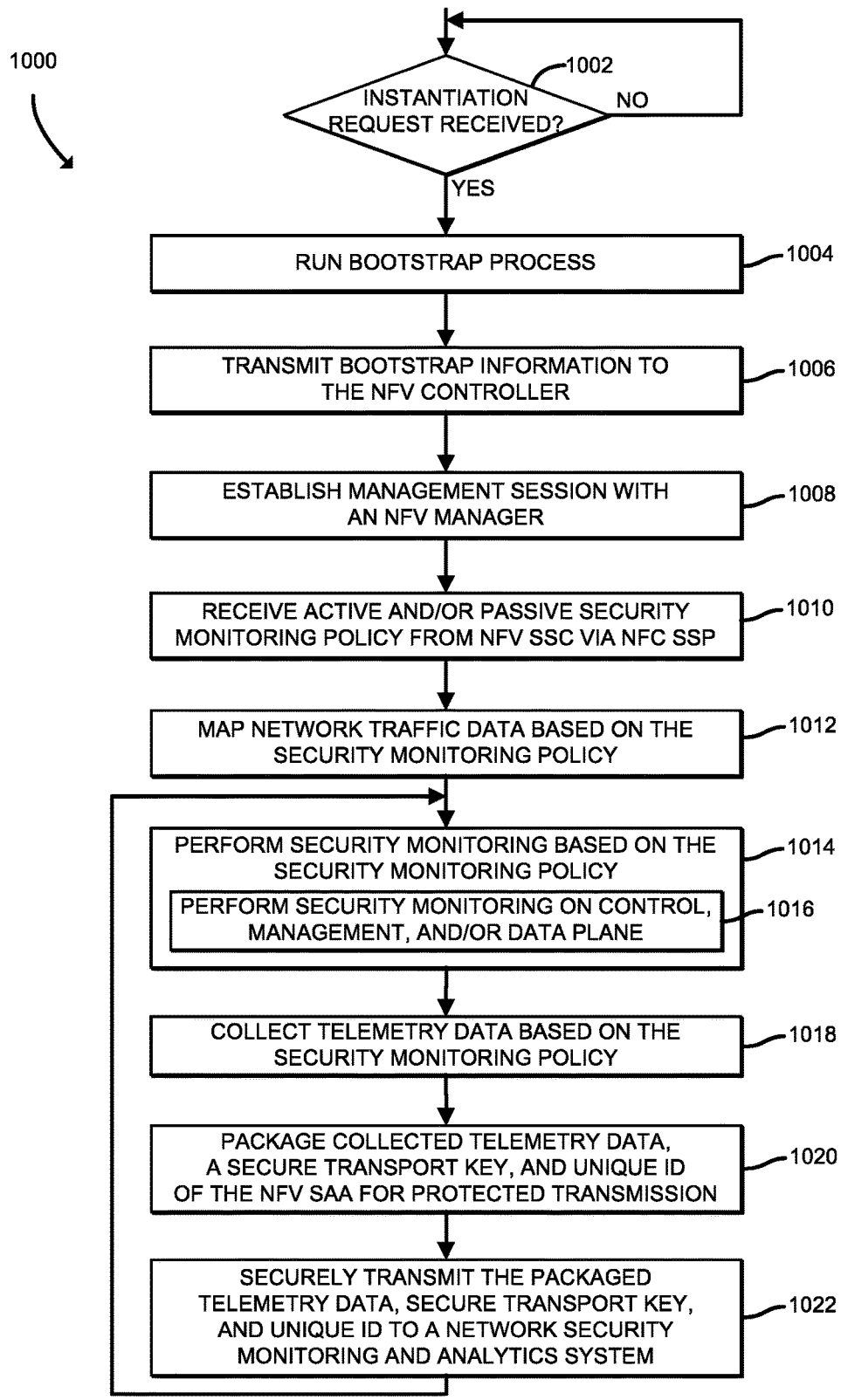
FIG. 10 is a simplified flow diagram of at least one embodiment of a method for monitoring the security of the NFV network architecture of FIG. 1 that may be executed by one or more of the NFV security service agents of FIG. 4.

Referring now to FIG. 10, in use, one of the NFV security services agents may execute a method 1000 for monitoring the security of the NFV security architecture 116. The method 1000 begins at block 1002, in which the NFV security services agent determines whether an instantiation request was received. If not, the method 1000 loops back to block 1002 to continue to wait for an instantiation request. If the instantiation request was received at block 1002, the method 1000 advances to block 1004. At block 1004 the NFV security services agent runs a bootstrap process to deploy the NFV security services agent, which loads the NFV security services agent on a computing node (e.g., one of the computing nodes 110). Accordingly, the bootstrap process may allow for optimization based on the NFV infrastructure 108 and/or the component of the NFV infrastructure 108 on which the NFV security services agent is deployed, such as acceleration, scalability, rapid deployment, etc. of the NFV security services agents across the NFV infrastructure 108.

At block 1006, the NFV security services agent transmits bootstrap information to the NFV security services controller 102. The bootstrap information may include bootstrap configuration parameters that may be used by the bootstrap to instantiate the NFV security services agent, personalization information for a particular NFV security services agent instance, and/or license information of the NFV security services agent instance, for example. At block 1008, the NFV security services agent establishes a management session with an VNF manager (e.g., the VNF manager 432). Accordingly, the VNF manager with which the management session has been established can assume management control of the NFV security services agent. At block 1010, the NFV security services agent receives a security monitoring policy for active and/or passive monitoring from the NFV security services controller 102 via the NFV security services provider 420. Accordingly, the NFV security services agent may only receive a portion of the security monitoring policy that is relative to the NFV security services agent.

At block 1012, the NFV security services agent maps the network traffic data for monitoring and/or collection based on the security monitoring policy. In other words, the NFV security services agent maps which network traffic to monitor based on the security monitoring policy. At block 1014, the NFV security services agent performs the security monitoring (e.g., the security monitoring of the mapped network traffic) based on the security monitoring policy. To do so, at block 1016, the NFV security services agent performs the security monitoring on the control, management, and/or data plane(s). In some embodiments, based on the security monitoring policy, the monitoring may be a continuous monitoring with a provisioned telemetry monitoring or a specific monitoring policy delivery and activation based on manual or automated anomaly detection. Additionally or alternatively, in some embodiments, the monitoring may be triggered by an administrator based on criteria specified by the administrator.

At block 1018, the NFV security services agent collects the telemetry data. The collected telemetry data may include virtual and/or physical network statistics, network health monitoring information, network packets (e.g., entire flows of network packets, random network packets, etc.), and/or any other component configuration or network packet related data. In some embodiments, the NFV security services agent may collect the telemetry data via a security monitoring collection agent (e.g., the security monitoring collection agent 472 of FIG. 4) that is configured to collect the telemetry data at a protected local storage. At block 1020, the NFV security services agent packages the collected telemetry data, a secure transport key, and a unique identifier of the NFV security services agent for protected transmission. At block 1022, the NFV security services agent securely transmits the packaged telemetry data, the secure transport key, and the unique identifier via a secure communication channel (e.g., the secure communication channel 490 of FIG. 4) to an NFV security monitoring analytics system (e.g., the NFV security monitoring analytics system 438 of FIG. 4) that is configured to analyze the telemetry data for threats and/or anomalies.

It should be appreciated that, in some embodiments, any one or more of the methods 700, 800, and/or 1000 may be embodied as various instructions stored on a computer-readable media, which may be executed by the processor 202, the network interface controller 220, and/or other components of the computing node 110 to cause the computing node 110 to perform the respective method 700, 800, and/or 1000. The computer-readable media may be embodied as any type of media capable of being read by the computing node 110 including, but not limited to, the memory 208, the data storage 214, local memory of the network interface controller 220, other memory or data storage devices of the computing node 110, portable media readable by a peripheral device of the computing node 110, and/or other media.

Figure 11:
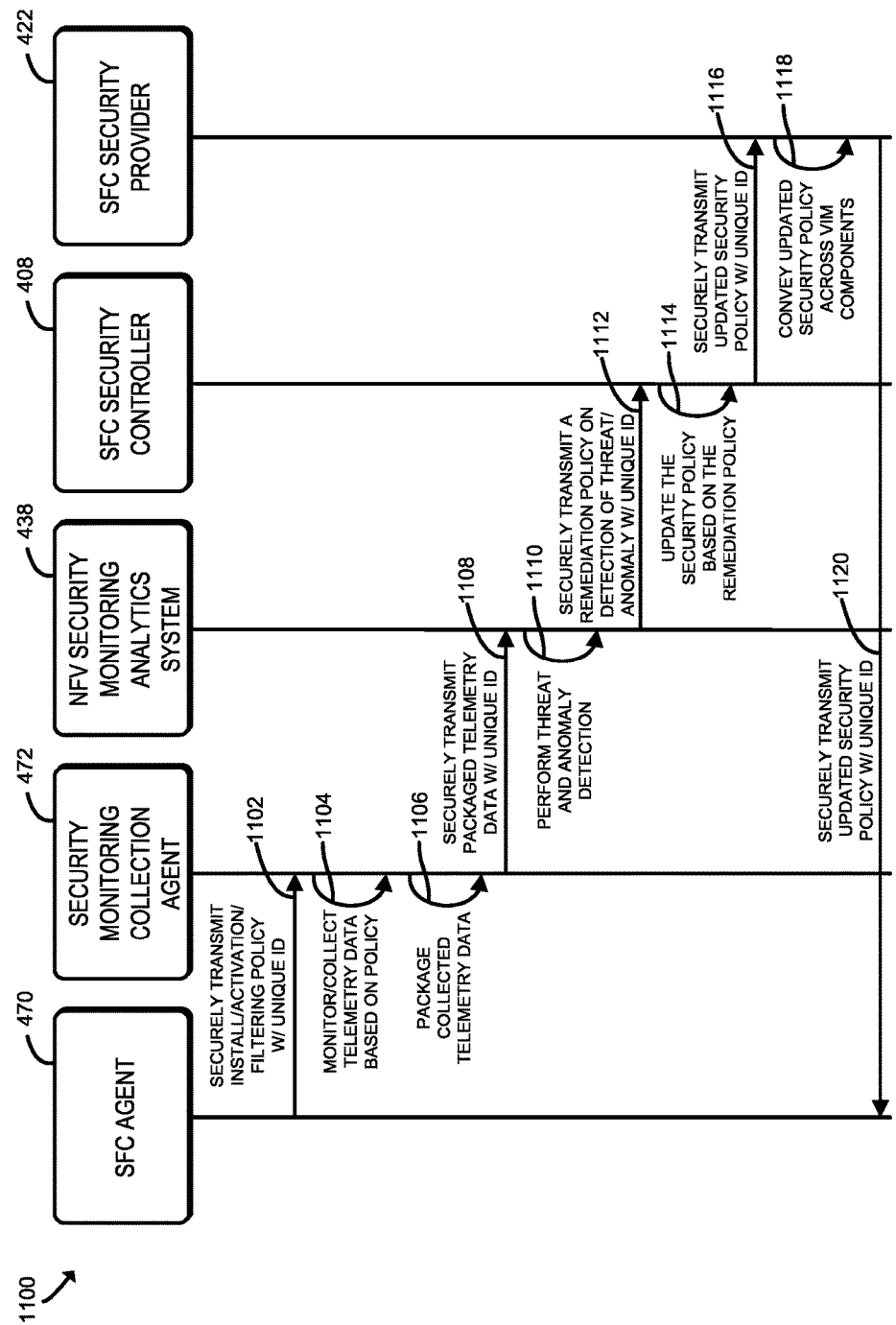
FIG. 11 is a simplified flow diagram of at least one embodiment of a communication flow for monitoring the security of service function chaining (SFC) of the NFV network architecture of FIG. 1.

Referring now to FIG. 11, an embodiment of a communication flow 1100 for monitoring the security of service function chaining (SFC) of the NFV security architecture 116 (e.g., at the illustrative service function chain VNFs 452 of FIG. 4) is shown. As described previously, a number of security monitoring components may be specifically configured, or include additional and/or alternative security monitoring components, to monitor the security of service function chains executed within an NFV infrastructure (e.g., the NFV infrastructure 108). For example, SFC-specific security monitoring components of the illustrative NFV security architecture 116 of FIG. 4 include the SFC security controller 408 of the NFV security services controller 102, the SFC security provider 422 of the NFV security services provider 420 of the VIM 106, and a number of SFC agents distributed throughout the NFV infrastructure 108 (e.g., the SFC agent 470) in various network monitoring and/or processing components, virtual and physical, of the NFV infrastructure 108. As also described previously, although the SFC agent 470 is shown in the NFV security services agent 468, it should be appreciated that each of the NFV security services agents distributed throughout the NFV infrastructure 108 may include an SFC agent. Accordingly, in some embodiments, an SFC agent may reside in a VNF of a SFC (e.g., one of the service function chain VNFs 452 of the service function chain 450).

The illustrative communication flow 1100 includes the SFC agent 470, the security monitoring collection agent 472, the NFV security monitoring analytics system 438, the SFC security controller 408, and the SFC security provider 422. The illustrative communication flow 1100 additionally includes a number of data flows, some of which may be executed separately or together, depending on the embodiment. At data flow 1102, the SFC agent 470 securely transmits an install, activation, and filtering policy and a unique identifier of the SFC agent 470 to the security monitoring collection agent 472. The install, activation, and filtering policy includes various instructions and information pertaining to the installation, activation, and protection of the SFC agent 470, as well as various instruction and information from which the security monitoring collection agent 472 can use to filter pertinent network traffic. For example, the security monitoring collection agent 472 may filter the network traffic to only monitor the network traffic indicated by the install, activation, and filtering policy. Accordingly, at data flow 1104, the security monitoring collection agent 472 monitors and collects telemetry data based on the install, activation, and filtering policy.

At data flow 1106, the security monitoring collection agent 472 packages the collected telemetry data for secure transmission to the NFV security monitoring analytics system 438. At data flow 1108, the security monitoring collection agent 472 securely transmits the packaged telemetry data to the NFV security monitoring analytics system 438 via a secure communication channel. Additionally, the packaged telemetry data may also include a unique identifier of the SFC agent 470. At data flow 1110, the NFV security monitoring analytics system 438 receives the packaged telemetry data and performs a security threat analysis on the received telemetry data. At data flow 1112, the NFV security monitoring analytics system 438 securely transmits a remediation policy and a unique identifier of the NFV security monitoring analytics system 438 via a secure communication channel upon detection of a security threat, such as an attack or an anomaly. The remediation policy may include one or more corrective actions that may be taken in response to detection of the security threat, such as to either address the threat or verify the anomaly. For example, the corrective action(s) may include blocking certain network traffic, streaming certain network traffic to a deep packet inspection (DPI) VNF instance, rate limiting or throttling the network traffic, etc.

At data flow 1114, the SFC security controller 408 updates the present security policy based on the remediation policy and the one or more corrective actions contained therein. At data flow 1116, the SFC security controller 408 securely transmits an updated security policy with an identifier unique to the instance of the SFC security controller 408 to the SFC security provider 422 via a secure communication channel. It should be appreciated that, in some embodiments, the SFC security controller 408 may be in secure communication with more than one SFC security provider 422, depending on the topology and distribution of the VIM 106. Accordingly, which of the SFC security providers 422 that the SFC security controller 408 communicates with (e.g., provide the security monitoring policy) may be dependent on the security monitoring policy. For example, a single SFC policy (i.e., a security monitoring policy specific to SFC) may be delivered to multiple SFC security providers 422 at different points of presence (POPs) (e.g., access points) if a service function chain spans across multiple POPs. In other words, each POP may be running a separate VIM 106 and, as such, a separate SFC security provider 422.

At data flow 1118, the SFC security provider 422 conveys the updated security policy across the VIM 106 (e.g., the VIM controller 424, the other VIM components 428, etc.). At data flow 1120, the SFC security provider 422 securely transmits the updated security policy and an identifier unique to the instance of the SFC security provider 422 to the SFC agent 470.

Figure 12:
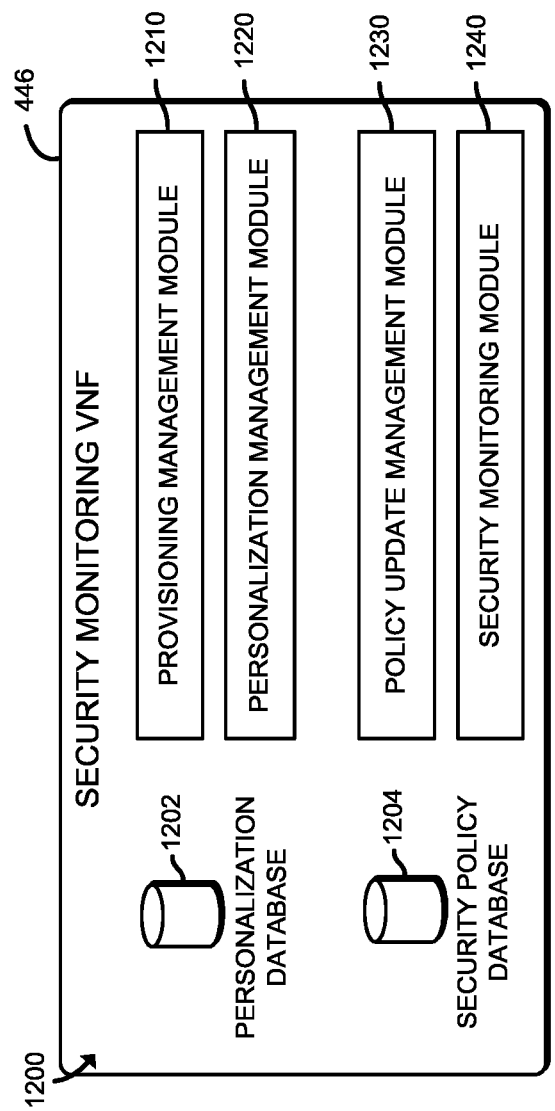
FIG. 12 is a simplified block diagram of at least one embodiment of an environment of a security monitoring VNF of the NFV security architecture of FIGS. 1 and 4.

Referring now to FIG. 12, in use, a security monitoring VNF (e.g., the security monitoring VNF 446 of FIG. 4) establishes an environment 1200 during operation. The illustrative environment 1200 of the NFV security services controller 102 includes a provisioning management module 1210, a personalization management module 1220, a policy update management module 1230, and a security monitoring module 1240. Each of the modules, logic, and other components of the environment 1200 may be embodied as hardware, firmware, software, or a combination thereof.

For example, the various modules, logic, and other components of the environment 1200 may form a portion of, or otherwise be established by hardware components of the security monitoring VNF 446. As such, in some embodiments, any one or more of the modules of the environment 500 may be embodied as a circuit or collection of electrical devices (e.g., provisioning management circuitry 1210, personalization management circuitry 1220, policy update management circuit 1230, and security monitoring circuitry 1240, etc.). Additionally or alternatively, in some embodiments, one or more of the illustrative modules may form a portion of another module and/or one or more of the illustrative modules and/or submodules, which may be embodied as standalone or independent modules.

The illustrative environment 1200 further includes a personalization database 1202 for storing personalization data that includes data usable to configure one or more functions (e.g., security functions) of the security monitoring VNF, such as secure configuration data, an initial set of parameters of the security monitoring VNF 446, metadata of the NFV security architecture 116, connection information about other VNFs (e.g., the network VNF 442, the service function chain VNFs 452 of the VNF instances 440, etc.), vendor-specific information, performance data, workload traffic engineering data, and/or quality of service (QoS) parameters and policies. In some embodiments, the personalization database 1202 may additionally include provisioning related data, such as a unique identifier of the security monitoring VNF 446, a unique identifier of a platform on which the security monitoring VNF 446 is being run, and a security credential. The illustrative environment 1200 additionally includes a security policy database 1204 for storing security policy information of the security monitoring VNF 446 and security monitoring information (e.g., logs, alerts, statistics, etc.). The security policy information may include a tenant specific security processing policy, a security traffic policy, a security group policy, a network services processing policy, etc. It should be appreciated that, in some embodiments, any one or more modules and/or submodules may be configured to store and/or retrieve data in the personalization database 1202 and/or the security policy database 1204.

The provisioning management module 1210 is configured to receive provisioning data (e.g., an identifier of the VNF, an identifier of the platform, a security credential, etc.) from the NFV security services controller 102 and perform a mutually authenticated key exchange procedure to establish a secure communication path (e.g., secure communication channel 434) between the security monitoring VNF 446 and a VNF manager (e.g., the VNF manager 432). To do so, the security monitoring VNF 446 may use a security credential included with the provisioning data received from the NFV security services controller 102. In some embodiments, the provisioning data may be received using an out-of-band (OOB) communication technology.

The personalization management module 1220 is configured to receive personalization data usable to configure one or more functions (e.g., security functions) of the security monitoring VNF, such as the secure communication path established by the provisioning management module 1210, from the VNF manager 432 via a secure communication path. The personalization management module 1220 is further configured to perform a personalization operation to configure the security monitoring VNF based on the personalization data received from the VNF manager 432. Additionally, the personalization management module 1220 is further configured to transmit a personalization operation status and a policy update operation status to the VNF manager 432. The personalization operation status and the policy update operation status may then be further transmitted to the NFV security services controller 102, which may then determine whether to activate a network-wide security policy for network traffic monitored by the security monitoring VNF 446.

The policy update management module 1230 is configured to receive policy information from the VNF manager 432 via a secure communication path, such as the secure communication path established by the provisioning management module 1210. The policy update management module 1230 is further configured to perform a policy update operation to update a security policy of the security monitoring VNF. The security monitoring module 1240 is configured to monitor network workload traffic to determine security monitoring information and transmit the security monitoring information to the VNF manager 432 via the secure communication path. In some embodiments, the security monitoring information may be securely transmitted from the security monitoring VNF to the VNF manager 432 via a security monitoring collection agent (e.g., the security monitoring collection agent 472 of FIG. 4). The security monitoring information may include various data related to the network workload traffic, such as logs, alerts, and statistics.

Figure 13:
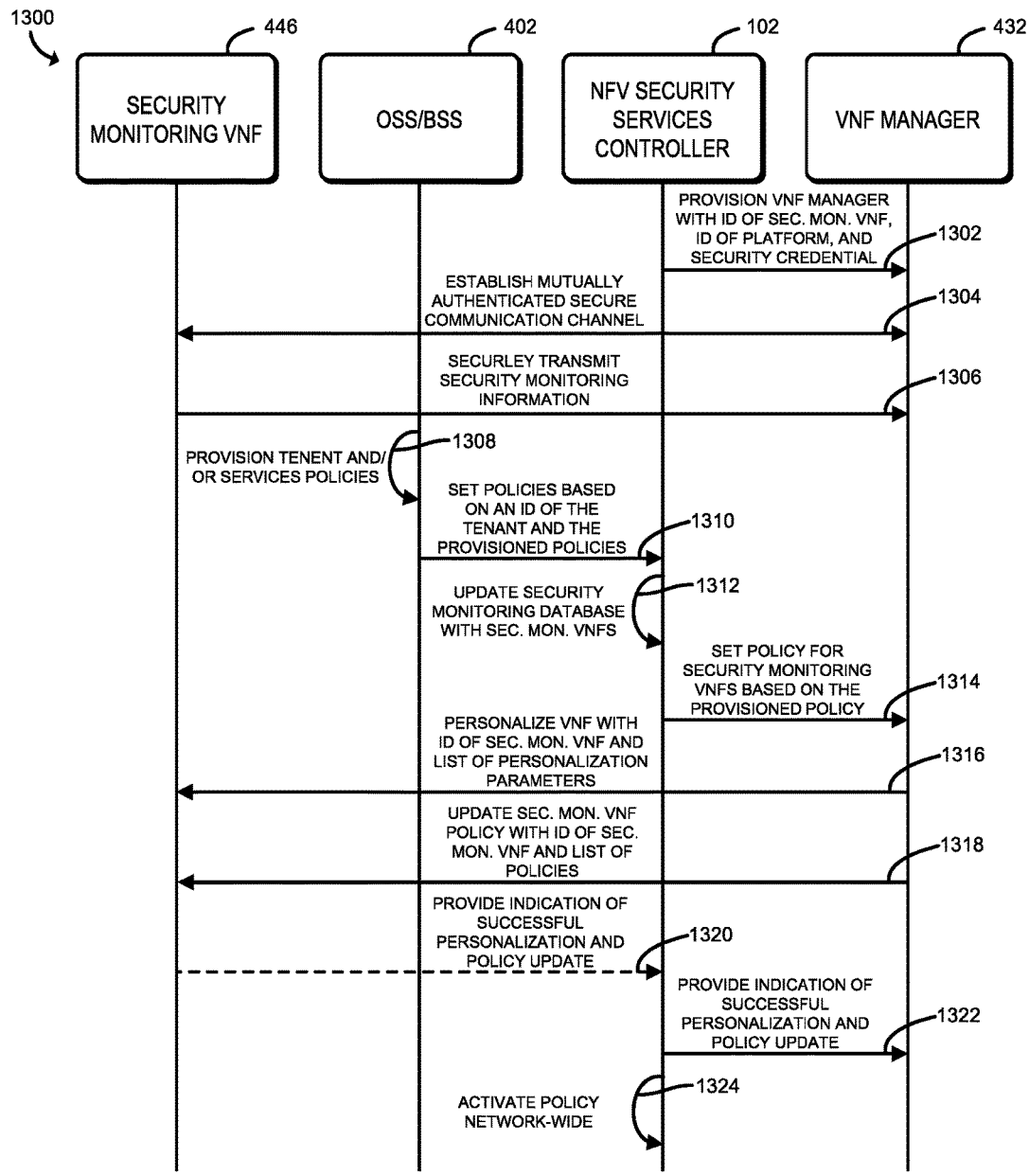
FIG. 13 is a simplified flow diagram of at least one embodiment of a communication flow for provisioning a secure VNF personalization and policy protocol of the NFV network architecture of FIG. 1.

Referring now to FIG. 13, an embodiment of a communication flow 1300 for provisioning a secure VNF personalization and policy protocol is shown. The illustrative communication flow 1300 includes the security monitoring VNF 446, the OSS/BSS 402, the NFV security services controller 102, and the VNF manager 432. The illustrative communication flow 1300 additionally includes a number of data flows, some of which may be executed separately or together, depending on the embodiment.

As described above, the secure instantiation (e.g., via secure bootstrapping) of the security monitoring VNF 446 enables a secure channel between the dynamically instantiated security monitoring VNF 446 and its respective VNF manager (e.g., the VNF manager 432 of FIG. 4). It should be appreciated that, in some embodiments, the secure channel may have been locally instantiated. It should be further appreciated that the security monitoring VNF 446 has been previously provisioned to establish a management session with their respective VNF manager (e.g., the VNF manager 432 of FIG. 4) prior to the communication flows of FIG. 13. Additionally, it should be appreciated that the security monitoring VNF 446 has also been activated after provisioning and prior to the communication flows of FIG. 13.

Accordingly, the now activated security monitoring VNF 446 may be personalized, which may include securely delivering VNF vendor specific private information (e.g., security credentials), performing a secure configuration with an initial set of parameters, provisioning with applicable metadata and state information, establishing state for inter-VNF connections (e.g., in an SFC), as well as seeding with any other VNF-specific information. Further, the personalization may include a secure delivery of a startup set of policies and/or behavioral parameters specific to the function that the security monitoring VNF 446 is to be configured to perform. Such polices and parameters may be dynamic and dependent on deployment security policy and procedures. It should be appreciated that, in some embodiments, the policies may be delivered at the initial post-secure bootstrap and/or during active execution of the security monitoring VNF 446. It should be further appreciated that, in some embodiments, the personalization and policy protocols may be dynamic and automated. For example, in an orchestration-driven system, each of the security monitoring VNFs 446 may be dynamically and securely installed using the protocols and procedures described above. Error! Reference source not found.

As described previously, the security monitoring VNF 446 has been previously instantiated and provisioned, during which time the security monitoring VNF 446 received a unique identifier (e.g., an IP address, a DNS, an FQDN, a URL, etc.) of the VNF manager 432 and a security credential that the NFV security services controller 102 used to provision the security monitoring VNF 446 instance. In data flow 1302, the NFV security services controller 102 provisions the VNF manager 432 with the identifier of the security monitoring VNF 446 and the identifier of the platform (e.g., an identifier of one of the platforms 480 of FIG. 4), as well as the security credential that the NFV security services controller 102 used to provision the security monitoring VNF 446. It should be appreciated that the provisioning step (i.e., the data flow 2) may be a prerequisite for the secure and trusted established communication channel between the security monitoring VNF 446 and the corresponding VNF manager managing the security monitoring VNF 446. In some embodiments, the provisioning step may be performed using a secure, out-of-band (OOB) provisioning technology.

In data flow 1304, the security monitoring VNF 446 and the VNF manager 432 perform a mutually authenticated key exchange procedure using the security credentials, which may be provisioned as described previously. The choice of mutual authentication security protocol may be established using a security policy of the NFV deployment (e.g., transport layer security (TLS)). In data flow 1306, using the secure and trusted channel established in data flow 1304, the security monitoring VNF 446 securely transmits security monitoring information (e.g., logs, alerts, statistics, etc.) to the VNF manager 432. In some embodiments, the security monitoring VNF 446 may open a dedicated channel (e.g., a management channel) with the VNF manager 432 to transmit the security monitoring information. In data flow 1308, one or more security monitoring VNFs 446 may be provisioned at the OSS/BSS 402 to be associated with a tenant, a service, and/or a network. Such an association may be based on the security policy of the new tenant, service, or network, and, accordingly, may be provisioned as such. In some embodiments, a tenant or service/network administrator may assign appropriate security monitoring VNFs 446 to one or more workloads.

In data flow 1310, the OSS/BSS 402 communicates this new tenant, service, or network provisioning to the NFV security services controller 102 such that policies can be set at the NFV security services controller 102. In some embodiments the communications may be made via an intermediary, such as the NFV orchestrator 104 of the illustrative NFV security architecture 116 of FIG. 4. Accordingly, in such embodiments, the NFV orchestrator 104 may be responsible for securely communicating policies (e.g., security policies) to the NFV security services controller 102 from the OSS/BSS 402. The security policies may be identified using an identifier of the tenant, for example, and associated with configurable security groups and/or other programmable structures and/or databases, such as those shown in the illustrative NFV security architecture 116 of FIG. 4. It should be appreciated that the NFV orchestrator 104 and the NFV security services controller 102 may have a secure, mutually authenticated channel to securely transmit information therebetween.

In data flow 1312, the NFV security services controller 102 may provision or update the new policy for the tenant, service or network, and the associated security group(s) or other security policy information. Accordingly, in some embodiments, the new policy may be stored in a database, such as the NFV security database 412 of FIG. 4. In some embodiments, the security policy, including sensitive information, may be securely stored therein using an encryption and securely accessed thereafter, based on the security policy.

In data flow 1314, the NFV security services controller 102 sets the policy for the security monitoring VNF 446 based on the policy updated, or provisioned, at data flow 1312. It should be appreciated that, in some embodiments, in doing so, the NFV security services controller 102 distributes the security policy across all of the VNF managers responsible for managing each of the VNF instances. The policy distribution may be conducted over a reliable protocol. Accordingly, in such embodiments, the NFV security services controller 102 may maintain state and ensure policy consistency and delivery assurance across the NFV security architecture 116. In some embodiments, such as in hybrid VNF network architectures, the NFV security services controller 102 may deliver the security policy to VNF managers that manage physical network functions and/or virtual network functions. In data flow 1316, the VNF manager 432 pushes personalization data for the security monitoring VNF 446 to the security monitoring VNF 446. Such personalization data distribution may be conducted over a reliable protocol.

It should be appreciated that the personalization data may be pushed to additional security monitoring VNF instances that are affected by the new tenant, service, and/or network provisioning. Accordingly, each of the VNF managers of the respective security monitoring VNF instances may maintain state and ensure that all security monitoring VNF instances have received the personalization data. The personalization data may include data for performing the provisioning that a newly instantiated security monitoring VNF may need to process workload traffic, including secure configuration data, an initial set of security monitoring VNF parameters, meta-data, connection information about other VNFs, vendor-specific information, performance information, traffic engineering data, quality of service (QoS) parameters and policies, etc.

In data flow 1318, the VNF manager 432 pushes the tenant, service, and/or network security policy to the security monitoring VNF 446, such that the security monitoring VNF 446 can update local policies of the security monitoring VNF 446. The network security policy may include any security related policies, including a tenant specific security processing policy, a security traffic policy, a security group policy, a network services processing policy, etc. It should be appreciated that such a network security policy distribution may be conducted over a reliable protocol. Accordingly, the VNF manger 432 can maintain state and ensure that the security monitoring VNF 446 received the network security policy and/or personalization data.

In data flow 1320, the security monitoring VNF 446 may provide an indication to the NFV security services controller 102 that indicates the personalization and policy update(s) were successful. In data flow 1322, the VNF manager 432 reports back to the NFV security services controller 102 upon updating the personalization and security policy (e.g., receiving the indication from the security monitoring VNF 446 as in data flow 1320) with an indication that the personalization and/or the policy updates were successfully performed. Accordingly, the NFV security services controller 102 may also report back all failures and/or errors that may have occurred to the VNF manager 432. It should be appreciated that the NFV security services controller 102 may process any reported failure(s) and/or error(s), and issue an alert and/or status update to a security administrator of the NFV security architecture 116 in response to the reported failures and/or errors. Additionally or alternatively, the NFV security services controller 102 may securely log the failures and/or errors, as well as the alerts and/or status updates.

In data flow 1324, upon receiving successful responses from the VNF manager 432, the NFV security services controller 102 may activate a security policy for the workload traffic that extends across the NFV security architecture 116. Accordingly, to enable and activate workload traffic for the tenant, the NFV security services controller 102 may securely communicate with network-wide traffic switching elements, such as SDN controllers, Openstack Neutron plugins, various virtual and physical switch/router managers, etc.

In normal NFV operation, the security monitoring VNFs may be instantiated and triggered with personalization and policy information as per the protocols defined above. In a dynamic and automated NFV deployment, the existing services, tenants, and/or networks policies may be updated and securely and consistently pushed across the NFV security architecture 116 in a uniformly distributed fashion, including to any physical/hybrid network functions, as dictated by the security policy. Such security and monitoring updates may be triggered by an addition or removal of tenants, a tenant workload migration, an update to a tenant's service level agreement (SLA) and QoS, a geography based update, a regulatory requirement update, a failure, etc. As described previously, updates to the security policy may be taken as a corrective action in response to a health risk of an NFV to mitigate a security threat (e.g., malware detection, network DoS attacks, and/or other such security threats).

Figure 14:
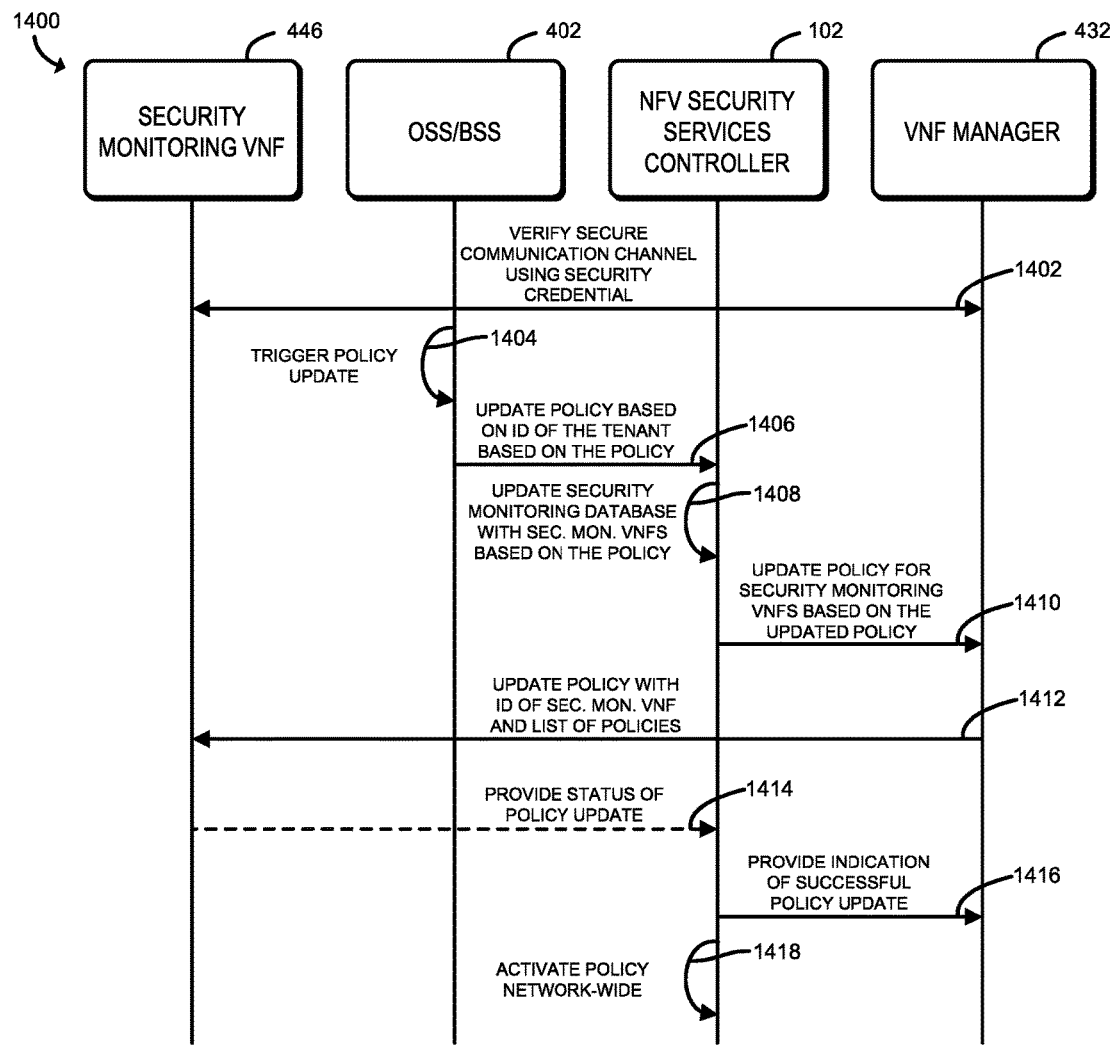
FIG. 14 is a simplified flow diagram of at least one embodiment of a communication flow for updating the secure VNF personalization and policy protocol of FIG. 12.

Referring now to FIG. 14, an embodiment of a communication flow 1400 for updating the secure VNF personalization and policy protocol is shown. Similar to the communication flow 1300 of FIG. 13, the illustrative communication flow 1400 includes the security monitoring VNF 446, the OSS/BSS 402, the NFV security services controller 102, and the VNF manager 432. The illustrative communication flow 1400 additionally includes a number of data flows, some of which may be executed separately or together, depending on the embodiment.

It should be appreciated that, prior to the update communication flow 1400 being performed, the initial provisioning of the VNF personalization and policy protocol, as described in FIG. 13, has been successfully executed. In data flow 1402, a secure communication channel between the security monitoring VNF and the VNF manager 432 (e.g., the secure communication channel established in the communication flow 1300 of FIG. 13) is verified. As described previously, the security monitoring VNF 446 and the VNF manager 432 may have established a secure, mutually authenticated channel in which to communicate therebetween. Accordingly, that established communication channel may be used in some embodiments. However, in some other embodiments, the NFV security deployment policy may define that a new secure channel is to be set up for the update procedure to ensure security credentials are still current and active.

In data flow 1404, a system event captured and/or relayed by the OSS/BSS 402 may trigger the secure VNF personalization and policy update procedure. As described above, the update procedure may be triggered by detecting an addition/removal of tenants, in response to a network or system threat, other security policy updates, etc. It should be appreciated that the system events may be automated, manual, time-driven, and/or dynamic. In data flow 1406, the new policy is delivered from the OSS/BSS 402 (e.g., via the NFV orchestrator 104) to the NFV security services controller 102. In data flow 1408, the NFV security services controller 102 updates the new security policies, security groups, and other associated configurations into a secure database, such as the NFV security database 412.

In data flow 1410, the NFV security services controller 102 transmits a secure policy update to the VNF manager 432. It should be appreciated that the NFV security services controller 102 transmits all of the affected VNF managers. Accordingly, the NFV security services controller 102 may track the VNF managers for all of the VNFs and/or security monitoring VNFs deployed in the NFV security architecture 116. In data flow 1412, the VNF manager 432 pushes the new policy update to the security monitoring VNF 446. It should be appreciate that the new policy update may be pushed to additional affected security monitoring VNF instances. Upon receiving the new policy update, the security monitoring VNF 446 may abandon present execution, exit, block all traffic, and continue execution until another trigger is received, etc.

In some embodiments, in data flow 1414, the security monitoring VNF 446 may transmit an indication to the NFV security services controller 102 that indicates the policy was successfully updated. In data flow 1416, the VNF manager 432 provides an indication to the NFV security services controller 102 with a status of the update operation (e.g., success, failure, error, etc.). Accordingly, the NFV security services controller 102 may also report back all failures and/or errors that may have occurred during the policy update to the VNF manager 432. It should be appreciated that the NFV security services controller 102 may process any reported failure(s) and/or error(s), and issue an alert and/or status update to a security administrator of the NFV security architecture 116 in response to the reported failures and/or errors. Additionally or alternatively, the NFV security services controller 102 may securely log the failures and/or errors, as well as the alerts and/or status updates.

It should be appreciated that such security policy updates have been pushed across the entire NFV security architecture 116 (e.g., NFV, physical, and/or hybrid networks) to one or more other security monitoring VNF instances. In data flow 1418, the new policies may be activated by the NFV security services controller 102 network-wide, based on the security policy, upon receiving a status that indicates the policy update successfully completed. It should be appreciated that successful execution of the policy update protocol should ensure a secure, consistent new state of the NFV deployment, including mixed deployments with physical security functions.

EXAMPLES

Illustrative examples of the technologies disclosed herein are provided below. An embodiment of the technologies may include any one or more, and any combination of, the examples described below.

Example 1 includes a security monitoring virtual network function (VNF) for performing security monitoring in a network functions virtualization (NFV) architecture, the security monitoring VNF comprising one or more processors; and one or more memory devices having stored therein a plurality of instructions that, when executed by the one or more processors, cause the security monitoring VNF to receive provisioning data from an NFV security services controller of the NFV architecture in network communication with the security monitoring VNF; perform a mutually authenticated key exchange procedure with a VNF manager of the NFV architecture using at least a portion of the provisioning data to establish a secure communication path between the security monitoring VNF and the VNF manager; receive personalization data from the VNF manager via the secure communication path, wherein the personalization data includes data usable to configure one or more security functions of the security monitoring VNF; and perform a personalization operation to configure the security monitoring VNF based on the personalization data.

Example 2 includes the subject matter of Example 1, and wherein the plurality of instructions further cause the security monitoring VNF to receive policy information from the VNF manager via the secure communication path; and perform a policy update operation to update a security policy of the security monitoring VNF.

Example 3 includes the subject matter of any of Examples 1 and 2, and wherein the policy information includes at least one of a tenant specific security processing policy, a security traffic policy, a security group policy, and a network services processing policy.

Example 4 includes the subject matter of any of Examples 1-3, and wherein to receive the provisioning data comprises to receive the provisioning data using an out-of-band communication.

Example 5 includes the subject matter of any of Examples 1-4, and wherein the provisioning data includes a unique identifier of the security monitoring VNF, a unique identifier of a platform on which the security monitoring VNF is being run, and a security credential.

Example 6 includes the subject matter of any of Examples 1-5, and wherein to perform the mutually authenticated key exchange procedure comprises to perform the mutually authenticated key exchange procedure using the security credential.

Example 7 includes the subject matter of any of Examples 1-6, and wherein the plurality of instructions further cause the security monitoring VNF to transmit security monitoring information to the VNF manager via the secure communication path, wherein the security monitoring information includes at least one of logs, alerts, and statistics of the security monitoring VNF.

Example 8 includes the subject matter of any of Examples 1-7, and wherein the personalization data includes at least one of secure configuration data, an initial set of parameters of the security monitoring VNF, metadata of the NFV architecture, connection information about other VNFs, vendor-specific information, performance data, workload traffic engineering data, and quality of service (QoS) parameters and policies.

Example 9 includes the subject matter of any of Examples 1-8, and wherein the plurality of instructions further cause the security monitoring VNF to transmit a personalization operation status and a policy update operation status to the VNF manager, wherein the personalization operation status and the policy update operation status are usable by the NFV security services controller to determine whether to activate a network-wide security policy for network traffic monitored by the security monitoring VNF.

Example 10 includes a method for secure personalization of a security monitoring virtual network function (VNF) in a network functions virtualization (NFV) architecture, the method comprising receiving, by the security monitoring VNF, provisioning data from an NFV security services controller of the NFV architecture in network communication with the security monitoring VNF; performing, by the security monitoring VNF, a mutually authenticated key exchange procedure with a VNF manager of the NFV architecture using at least a portion of the provisioning data to establish a secure communication path between the security monitoring VNF and the VNF manager; receiving, by the security monitoring VNF, personalization data from the VNF manager via the secure communication path, wherein the personalization data includes data usable to configure one or more security functions of the security monitoring VNF; and performing, by the security monitoring VNF, a personalization operation to configure the security monitoring VNF based on the personalization data.

Example 11 includes the subject matter of Example 10, and further comprising receiving, by the security monitoring VNF, policy information from the VNF manager via the secure communication path; and performing, by the security monitoring VNF, a policy update operation to update a security policy of the security monitoring VNF.

Example 12 includes the subject matter of any of Examples 10 and 11, and wherein receiving the policy information comprises receiving at least one of a tenant specific security processing policy, a security traffic policy, a security group policy, and a network services processing policy.

Example 13 includes the subject matter of any of Examples 10-12, and wherein receiving the provisioning data comprises receiving the provisioning data using an out-of-band communication.

Example 14 includes the subject matter of any of Examples 10-13, and wherein the provisioning data includes a unique identifier of the security monitoring VNF, a unique identifier of a platform on which the security monitoring VNF is being run, and a security credential.

Example 15 includes the subject matter of any of Examples 10-14, and wherein performing the mutually authenticated key exchange procedure comprises performing the mutually authenticated key exchange procedure using the security credential.

Example 16 includes the subject matter of any of Examples 10-15, and further including transmitting, by the security monitoring VNF, security monitoring information to the VNF manager via the secure communication path, wherein the security monitoring information includes at least one of logs, alerts, and statistics of the security monitoring VNF.

Example 17 includes the subject matter of any of Examples 10-16, and wherein receiving personalization data comprises receiving at least one of secure configuration data, an initial set of parameters of the security monitoring VNF, metadata of the NFV architecture, connection information about other VNFs, vendor-specific information, performance data, workload traffic engineering data, and quality of service (QoS) parameters and policies.

Example 18 includes the subject matter of any of Examples 10-17, and further including transmitting, by the security monitoring VNF, a personalization operation status and a policy update operation status to the VNF manager, wherein the personalization operation status and the policy update operation status are usable by the NFV security services controller to determine whether to activate a network-wide security policy for network traffic monitored by the security monitoring VNF.

Example 19 includes a computing device comprising a processor; and a memory having stored therein a plurality of instructions that when executed by the processor cause the computing device to perform the method of any of Examples 10-18.

Example 20 includes one or more machine readable storage media comprising a plurality of instructions stored thereon that in response to being executed result in a computing device performing the method of any of Examples 10-18.

Example 21 includes a security monitoring virtual network function (VNF) for performing security monitoring in a network functions virtualization (NFV) architecture, the security monitoring VNF comprising provisioning management circuitry to receive provisioning data from an NFV security services controller of the NFV architecture in network communication with the security monitoring VNF and perform a mutually authenticated key exchange procedure with a VNF manager of the NFV architecture using at least a portion of the provisioning data to establish a secure communication path between the security monitoring VNF and the VNF manager; and personalization management circuitry to receive personalization data from the VNF manager via the secure communication path, wherein the personalization data includes data usable to configure one or more security functions of the security monitoring VNF and perform a personalization operation to configure the security monitoring VNF based on the personalization data.

Example 22 includes the subject matter of Example 21, and further including policy update management circuitry to receive policy information from the VNF manager via the secure communication path and perform a policy update operation to update a security policy of the security monitoring VNF.

Example 23 includes the subject matter of any of Examples 21 and 22, and wherein the policy information includes at least one of a tenant specific security processing policy, a security traffic policy, a security group policy, and a network services processing policy.

Example 24 includes the subject matter of any of Examples 21-23, and wherein to receive the provisioning data comprises to receive the provisioning data using an out-of-band communication.

Example 25 includes the subject matter of any of Examples 21-24, and wherein the provisioning data includes a unique identifier of the security monitoring VNF, a unique identifier of a platform on which the security monitoring VNF is being run, and a security credential.

Example 26 includes the subject matter of any of Examples 21-25, and wherein to perform the mutually authenticated key exchange procedure comprises to perform the mutually authenticated key exchange procedure using the security credential.

Example 27 includes the subject matter of any of Examples 21-26, and further including security monitoring circuitry to transmit security monitoring information to the VNF manager via the secure communication path, wherein the security monitoring information includes at least one of logs, alerts, and statistics of the security monitoring VNF.

Example 28 includes the subject matter of any of Examples 21-27, and wherein the personalization data includes at least one of secure configuration data, an initial set of parameters of the security monitoring VNF, metadata of the NFV architecture, connection information about other VNFs, vendor-specific information, performance data, workload traffic engineering data, and quality of service (QoS) parameters and policies.

Example 29 includes the subject matter of any of Examples 21-28, and wherein the personalization management circuitry is further to transmit a personalization operation status and a policy update operation status to the VNF manager, wherein the personalization operation status and the policy update operation status are usable by the NFV security services controller to determine whether to activate a network-wide security policy for network traffic monitored by the security monitoring VNF.

Example 30 includes a security monitoring virtual network function (VNF) for performing security monitoring in a network functions virtualization (NFV) architecture, the security monitoring VNF comprising provisioning management circuitry to receive provisioning data from an NFV security services controller of the NFV architecture in network communication with the security monitoring VNF; means for performing a mutually authenticated key exchange procedure with a VNF manager of the NFV architecture using at least a portion of the provisioning data to establish a secure communication path between the security monitoring VNF and the VNF manager; personalization management circuitry to receive personalization data from the VNF manager via the secure communication path, wherein the personalization data includes data usable to configure one or more security functions of the security monitoring VNF; and means for performing, by the security monitoring VNF, a personalization operation to configure the security monitoring VNF based on the personalization data.

Example 31 includes the subject matter of Example 30, and further including policy update management circuitry to receive policy information from the VNF manager via the secure communication path; and means for performing a policy update operation to update a security policy of the security monitoring VNF.

Example 32 includes the subject matter of any of Examples 30 and 31, and wherein the means for receiving the policy information comprises means for receiving at least one of a tenant specific security processing policy, a security traffic policy, a security group policy, and a network services processing policy.

Example 33 includes the subject matter of any of Examples 30-32, and wherein the means for receiving the provisioning data comprises means for receiving the provisioning data using an out-of-band communication.

Example 34 includes the subject matter of any of Examples 30-33, and wherein the provisioning data includes a unique identifier of the security monitoring VNF, a unique identifier of a platform on which the security monitoring VNF is being run, and a security credential.

Example 35 includes the subject matter of any of Examples 30-34, and wherein the means for performing the mutually authenticated key exchange procedure comprises means for performing the mutually authenticated key exchange procedure using the security credential.

Example 36 includes the subject matter of any of Examples 30-35, and further including means for transmitting security monitoring information to the VNF manager via the secure communication path, wherein the security monitoring information includes at least one of logs, alerts, and statistics of the security monitoring VNF.

Example 37 includes the subject matter of any of Examples 30-36, and wherein the means for receiving personalization data comprises means for receiving at least one of secure configuration data, an initial set of parameters of the security monitoring VNF, metadata of the NFV architecture, connection information about other VNFs, vendor-specific information, performance data, workload traffic engineering data, and quality of service (QoS) parameters and policies.

Example 38 includes the subject matter of any of Examples 30-37, and further including means for transmitting a personalization operation status and a policy update operation status to the VNF manager, wherein the personalization operation status and the policy update operation status are usable by the NFV security services controller to determine whether to activate a network-wide security policy for network traffic monitored by the security monitoring VNF.

The invention claimed is:

1. A network functions virtualization (NFV) system comprising a security monitoring virtual network function (VNF) for performing security monitoring in the network functions virtualization (NFV) system, wherein the security monitoring VNF comprises:
   one or more processors; and
   one or more memory devices having stored therein a plurality of instructions that, when executed by the one or more processors, cause the security monitoring VNF to:

receive provisioning data from an NFV security services controller of the NFV system in network communication with the security monitoring VNF, wherein the provisioning data includes a unique identifier of the security monitoring VNF, a unique identifier of a platform on which the security monitoring VNF is being run, and a security credential;

perform a mutually authenticated key exchange procedure with a VNF manager of the NFV system using at least a portion of the provisioning data to establish a secure communication path between the security monitoring VNF and the VNF manager;

receive personalization data from the VNF manager via the secure communication path, wherein the personalization data includes data usable to configure one or more security functions of the security monitoring VNF; and perform a personalization operation to configure the security monitoring VNF based on the personalization data.

2. The network functions virtualization (NFV) system of claim 1, wherein the plurality of instructions further cause the security monitoring VNF to:
receive policy information from the VNF manager via the secure communication path; and
perform a policy update operation to update a security policy of the security monitoring VNF.

3. The network functions virtualization (NFV) system of claim 2, wherein the policy information includes at least one of a tenant specific security processing policy, a security traffic policy, a security group policy, and a network services processing policy.

4. The network functions virtualization (NFV) system of claim 1, wherein to receive the provisioning data comprises to receive the provisioning data using an out-of-band communication.

5. The network functions virtualization (NFV) system of claim 1, wherein to perform the mutually authenticated key exchange procedure comprises to perform the mutually authenticated key exchange procedure using the security credential.

6. The network functions virtualization (NFV) system of claim 1, wherein the plurality of instructions further cause the security monitoring VNF to transmit security monitoring information to the VNF manager via the secure communication path, wherein the security monitoring information includes at least one of logs, alerts, and statistics of the security monitoring VNF.

7. The network functions virtualization (NFV) system of claim 1, wherein the personalization data includes at least one of secure configuration data, an initial set of parameters of the security monitoring VNF, metadata of the NFV architecture, connection information about other VNFs, vendor-specific information, performance data, workload traffic engineering data, and quality of service (QoS) parameters and policies.

8. The network functions virtualization (NFV) system of claim 1, wherein the plurality of instructions further cause the security monitoring VNF to transmit a personalization operation status and a policy update operation status to the VNF manager, wherein the personalization operation status and the policy update operation status are usable by the NFV security services controller to determine whether to activate a network-wide security policy for network traffic monitored by the security monitoring VNF.

9. One or more non-transitory, computer-readable storage media comprising a plurality of instructions stored thereon that, when executed, causes a security monitoring virtual network function (VNF) of a network functions virtualization (NFV) system to:

receive provisioning data from an NFV security services controller of the NFV system in network communication with the security monitoring VNF, wherein the provisioning data includes a unique identifier of the security monitoring VNF, a unique identifier of a platform on which the security monitoring VNF is being run, and a security credential;

perform a mutually authenticated key exchange procedure with a VNF manager of the NFV system using at least a portion of the provisioning data to establish a secure communication path between the security monitoring VNF and the VNF manager;

receive personalization data from the VNF manager via the secure communication path, wherein the personalization data includes data usable to configure one or more security functions of the security monitoring VNF; and perform a personalization operation to configure the security monitoring VNF based on the personalization data.

10. The one or more non-transitory, computer-readable storage media of claim 9, further comprising a plurality of instructions that in response to being executed cause the security monitoring VNF to:
receive policy information from the VNF manager via the secure communication path; and
perform a policy update operation to update a security policy of the security monitoring VNF.

11. The one or more non-transitory, computer-readable storage media of claim 10, wherein the policy information includes at least one of a tenant specific security processing policy, a security traffic policy, a security group policy, and a network services processing policy.

12. The one or more non-transitory, computer-readable storage media of claim 9, wherein to receive the provisioning data comprises to receive the provisioning data using an out-of-band communication.

13. The one or more non-transitory, computer-readable storage media of claim 9, wherein to perform the mutually authenticated key exchange procedure comprises to perform the mutually authenticated key exchange procedure using the security credential.

14. The one or more non-transitory, computer-readable storage media of claim 9, further comprising a plurality of instructions that in response to being executed cause the security monitoring VNF to transmit security monitoring information to the VNF manager via the secure communication path, wherein the security monitoring information includes at least one of logs, alerts, and statistics of the security monitoring VNF.

15. The one or more non-transitory, computer-readable storage media of claim 9, wherein the personalization data includes at least one of secure configuration data, an initial set of parameters of the security monitoring VNF, metadata of the NFV architecture, connection information about other VNFs, vendor-specific information, performance data, workload traffic engineering data, and quality of service (QoS) parameters and policies.

16. The one or more non-transitory, computer-readable storage media of claim 9, further comprising a plurality of instructions that in response to being executed cause the security monitoring VNF to transmit a personalization operation status and a policy update operation status to the VNF manager, wherein the personalization operation status and the policy update operation status are usable by the NFV security services controller to determine whether to activate a network-wide security policy for network traffic monitored by the security monitoring VNF.

17. A method for secure personalization of a security monitoring virtual network function (VNF) in a network functions virtualization (NFV) system, the method comprising:
receiving, by the security monitoring VNF, provisioning data from an NFV security services controller of the NFV system in network communication with the security monitoring VNF, wherein the provisioning data includes a unique identifier of the security monitoring VNF, a unique identifier of a platform on which the security monitoring VNF is being run, and a security credential;
performing, by the security monitoring VNF, a mutually authenticated key exchange procedure with a VNF manager of the NFV system using at least a portion of the provisioning data to establish a secure communication path between the security monitoring VNF and the VNF manager;
receiving, by the security monitoring VNF, personalization data from the VNF manager via the secure communication path, wherein the personalization data includes data usable to configure one or more security functions of the security monitoring VNF; and
performing, by the security monitoring VNF, a personalization operation to configure the security monitoring VNF based on the personalization data.

18. The method of claim 17, further comprising:
receiving, by the security monitoring VNF, policy information from the VNF manager via the secure communication path; and
performing, by the security monitoring VNF, a policy update operation to update a security policy of the security monitoring VNF.

19. The method of claim 17, wherein receiving the provisioning data comprises receiving the provisioning data using an out-of-band communication.

20. The method of claim 17, further comprising transmitting, by the security monitoring VNF, security monitoring information to the VNF manager via the secure communication path, wherein the security monitoring information includes at least one of logs, alerts, and statistics of the security monitoring VNF.

21. The method of claim 17, further comprising transmitting, by the security monitoring VNF, a personalization operation status and a policy update operation status to the VNF manager, wherein the personalization operation status and the policy update operation status are usable by the NFV security services controller to determine whether to activate a network-wide security policy for network traffic monitored by the security monitoring VNF.

22. A network functions virtualization (NFV) system comprising a security monitoring virtual network function (VNF) for performing security monitoring in the network functions virtualization (NFV) system, wherein the security monitoring VNF comprises:
provisioning management circuitry to:
receive provisioning data from an NFV security services controller of the NFV system in network communication with the security monitoring VNF, wherein the provisioning data includes a unique identifier of the security monitoring VNF, a unique identifier of a platform on which the security monitoring VNF is being run, and a security credential;
perform a mutually authenticated key exchange procedure with a VNF manager of the NFV system using at least a portion of the provisioning data to establish a secure communication path between the security monitoring VNF and the VNF manager;
personalization management circuitry to:
receive personalization data from the VNF manager via the secure communication path, wherein the personalization data includes data usable to configure one or more security functions of the security monitoring VNF; and
perform, by the security monitoring VNF, a personalization operation to configure the security monitoring VNF based on the personalization data.

23. The network functions virtualization (NFV) system, wherein the security monitoring VNF further comprises:
policy update management circuitry to receive policy information from the VNF manager via the secure communication path; and
performing circuitry to perform a policy update operation to update a security policy of the security monitoring VNF.

* * * * *